United States Patent [19]
Koyama

[11] Patent Number: 5,355,421
[45] Date of Patent: Oct. 11, 1994

[54] METHOD OF NOISE DETECTION AND NOISE APPARATUS

[75] Inventor: Hiroo Koyama, Miyanodai, Japan

[73] Assignee: Fuji Photo Film Co., Ltd., Kanagawa, Japan

[21] Appl. No.: 944,940

[22] Filed: Sep. 15, 1992

[30] Foreign Application Priority Data

Sep. 19, 1991 [JP] Japan ................... 3-268341

[51] Int. Cl.$^5$ .......................... G06K 9/40; G06K 9/48
[52] U.S. Cl. ............................. 382/54; 382/22
[58] Field of Search .............. 382/9, 22, 54, 50, 60; 358/167, 463; 364/574

[56] References Cited

U.S. PATENT DOCUMENTS

| | | | |
|---|---|---|---|
| 3,700,797 | 10/1972 | Wernikoff | 358/453 |
| 3,980,870 | 9/1976 | Kawahara | 382/22 |
| 4,691,366 | 9/1987 | Fenster et al. | 382/54 |
| 4,703,512 | 10/1987 | Saka et al. | 382/22 |
| 4,769,849 | 9/1988 | Alsing | 382/54 |
| 5,029,226 | 7/1991 | Klein et al. | 382/54 |
| 5,048,096 | 9/1991 | Beato | 382/54 |
| 5,189,710 | 2/1993 | Holt | 382/22 |

FOREIGN PATENT DOCUMENTS

49-34385  3/1974  Japan.
29389  3/1990  Japan.

Primary Examiner—Michael T. Razavi
Assistant Examiner—David Fox
Attorney, Agent, or Firm—Sughrue, Mion, Zinn, Macpeak & Seas

[57] ABSTRACT

A method for identifying and removing noise from digitized images includes the steps for judging whether or not a group of black pixels represents a noise by analyzing the number of pixels in the group, the degree of flattening of the group and the curvature of the region. According to the inventive method, since the entire region is scanned at once, allowing the detection of various sized pixel groups, the black pixel groups meeting a predetermined level can be selected and removed from a corresponding predefined region. Thus, noise can be removed from several predefined regions using a different noise level for each region.

7 Claims, 25 Drawing Sheets

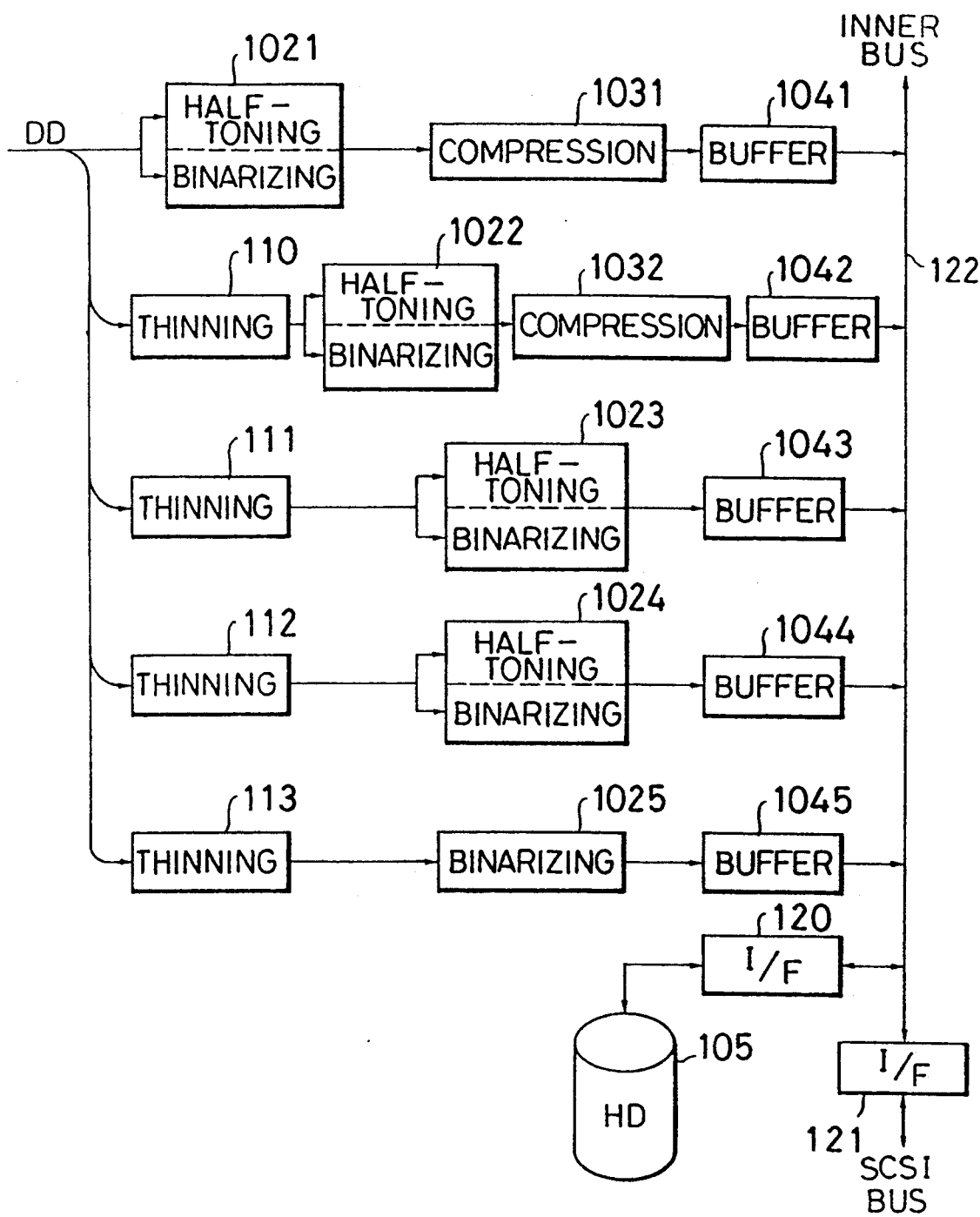
F I G. 2

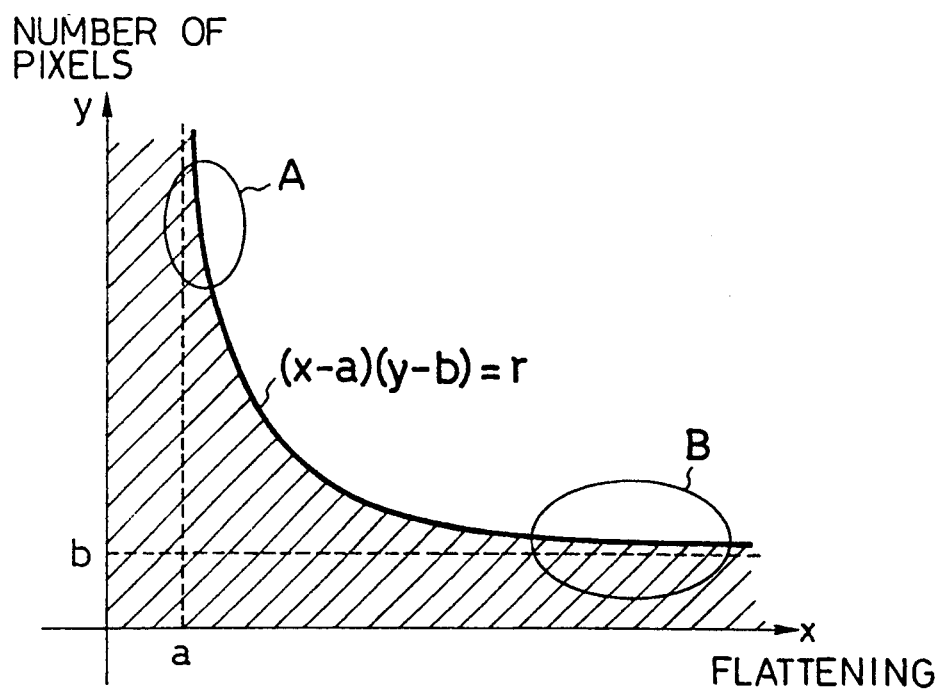
FIG. 10
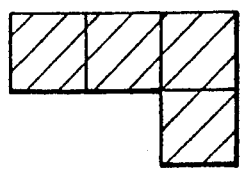      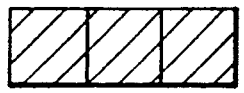      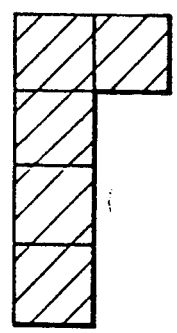
FIG. 11A            FIG. 11B            FIG. 11C

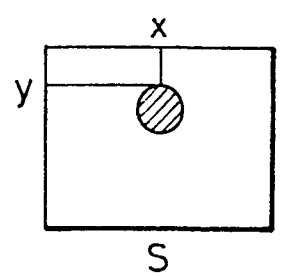 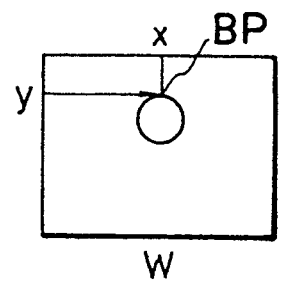
FIG. 16A   FIG. 16B
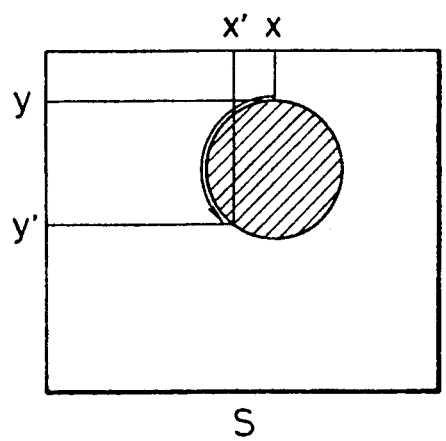 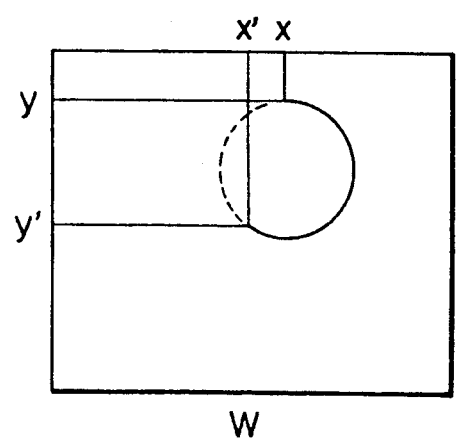
FIG. 17
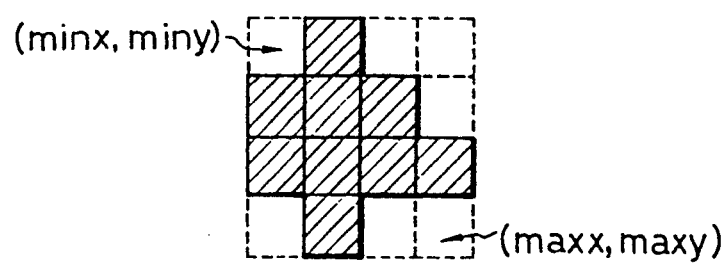
FIG. 18

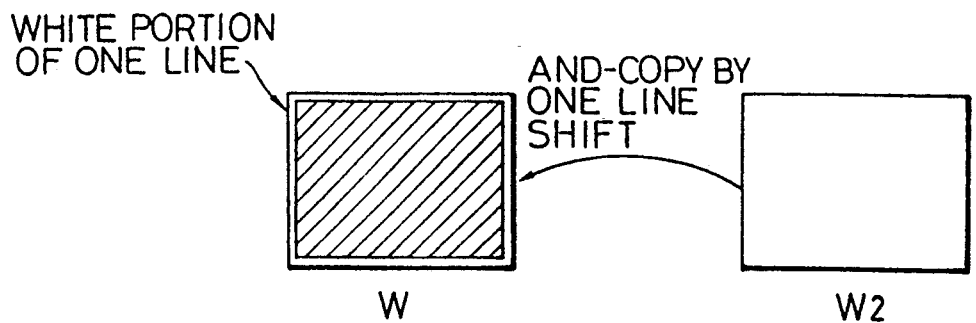
FIG. 29
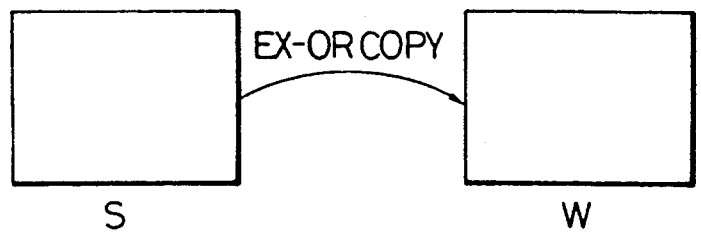
FIG. 30
| 3 | 2 | 1 |
|---|---|---|
| 4 | CP | 0 |
| 5 | 6 | 7 |
FIG. 31

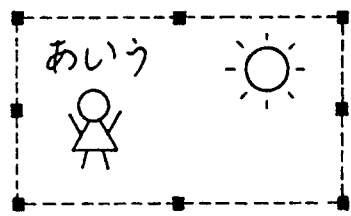
FIG. 43A
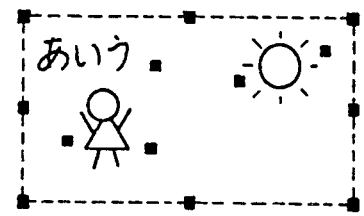
FIG. 43B
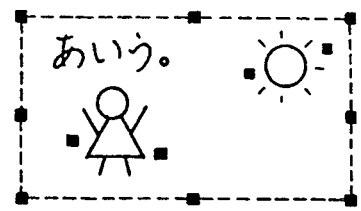
FIG. 43C
FIG. 43D
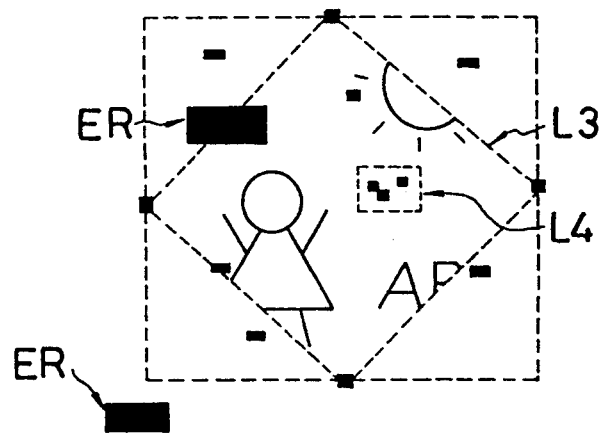
FIG. 44

METHOD OF NOISE DETECTION AND NOISE APPARATUS

BACKGROUND OF THE INVENTION

1. Field of the Invention

This invention relates to noise detection and erasing methods which can detect and erase at a high speed and a high efficiency noises contained in binary images which have been read by an input means such as a scanner and digitized, and the method can easily change the levels of erasing such noises.

2. Description of the Prior Art

There has been proposed by Japanese Patent Application Laid-open No. 34385/1974 a system (hereinafter referred to as "the first system") for erasing noises from images which judges whether an objective is a noise or not by reading an objective pixel and neighboring pixels, and conducting logical operations on the objective pixel with the neighboring pixels. In other words, the first system consecutively cuts out two dimensional local regions from a two-dimensional binary black/white pattern which is the object of processing, and conducts spatial logic processing of the logical state of the central pixel and that of the neighboring pixels so as to extract noises.

Since the first system judges whether the objective pixel is a noise or not from the relation of -the pixel with the neighboring pixels, it takes much time to erase the noises from all the images. Moreover, the system can judge the noises only in the unit of a pixel, and cannot erase linear noises which consist of two or more pixels.

Japanese Patent Publication 9389/1990 disclosed another system (hereinafter refer to as "the second system") which conducts the noise judgement of the above first system in the unit of a line, and erases a noise if there is one (in this case, a noise means the state of "1"). More particularly, the second system stores the objective image for each line, stores the data of each line by shifting it to the right, and stores the data of each line by shifting it to the left so as to erase minute isolated points by logical operation of the data in the unit of a line.

Since the second system uses the data on lines before and after an objective line, it can operate at a speed faster than that of the first system, but its operation is limited to the erasing of the minute isolated points. The second system is also problematic in that the control system becomes quite complicated. Even though the second system judges the noises in the unit of a line, a line comprises pixels and when realized in computer software, the system is not practical in terms of processing time. For example, when a mechanical sheet for print is read in the system, the noises caused by the mounting lines become laterally or longitudinally elongated noises comprising plural pixels, which cannot be erased by either the first or the second system.

SUMMARY OF THE INVENTION

This invention was conceived to overcome such defects of the prior art and aims to provide a method which can erase arbitrary noises with basically plural pixels by judging whether a group of black pixels (including isolated points) is a noise or not from a hyperbola of a given curvature having the number of the pixels of the group and the flattening (a ratio of the height against the width) thereof as asymptotes instead of judging only from an objective pixel and its neighboring pixels.

This invention relates to noise detection and erasing methods, and the above object of this invention is achieved by providing the steps of producing a contour image of the same size as the original image which is read by an input means and binarized, scanning said contour image, and while tracing the contour of said original image having the same coordinates as a black pixel which is found first, storing the pixels of said contour image and at the same time, erasing said contour.

More particularly, an image is read by an input means such as a scanner, and for the digitized binary pixel data, a contour having the width equal to a pixel of the original data is produced in a region of the same size as the region of the original image. Then, the contour image is sequentially scanned from, for example, the left top of the region, and a black pixel which is found first is processed as below.

① The contour of the original region is traced from the same coordinates as the black pixels of the contour image.

② In parallel to the above operation ①, the pixels on the contour image are obtained and the obtained contour pixels are erased.

③ The contour image pixels of the above operation ② are stored in a memory until they reach a given number.

④ The above operations ① through ③ are repeated until tracing comes back to the first point of the contour image, and if the length of the contour is less than a predetermined length, the pixels stored in the memory are registered as the candidate noise.

When all the scannings are completed, registered contour pixels may be judged whether or not they are noises and candidate noises are designated. These candidate noises are judged based on given conditions, and the pixels which are judged noises based on the above conditions are erased from the original image. The conditions to judge such a noise may preferably be hyperbolas of a given curvature and having the number of pixels and flattening as orthogonal asymptotic curves so that the judging conditions may be easily changed.

The nature, principle and utility of the invention will become more apparent from the following detailed description when read in conjunction with the accompanying drawings.

BRIEF DESCRIPTION OF THE DRAWINGS

In the accompanying drawings:

FIG. 2 is a block diagram to show an example Structure of an input controller;

FIG. 10 is a view to explain noise judgement conditions according to this invention;

FIGS. 11A to 11C are views to explain the flattening used in this invention;

FIGS. 16A and 16B are views to show how a black pixel is detected by scanning;

FIG. 17 is a view to explain tracing and erasing of a contour;

FIG. 18 is a view to show an example of noise block;

FIG. 29 is a view to explain AND-copying into the contour region W by shifting by one line;

FIG. 30 is a view to show exclusive OR-copying into the contour region W;

FIG. 31 is a view to explain chain codes in 8-neighboring pixels;

FIGS. 43A to 43D are views to explain the operation sequence of setting the noise erasing level;

FIG. 44 is a view to explain a noise erasing area;

DESCRIPTION OF THE PREFERRED EMBODIMENTS

Figure 1A:
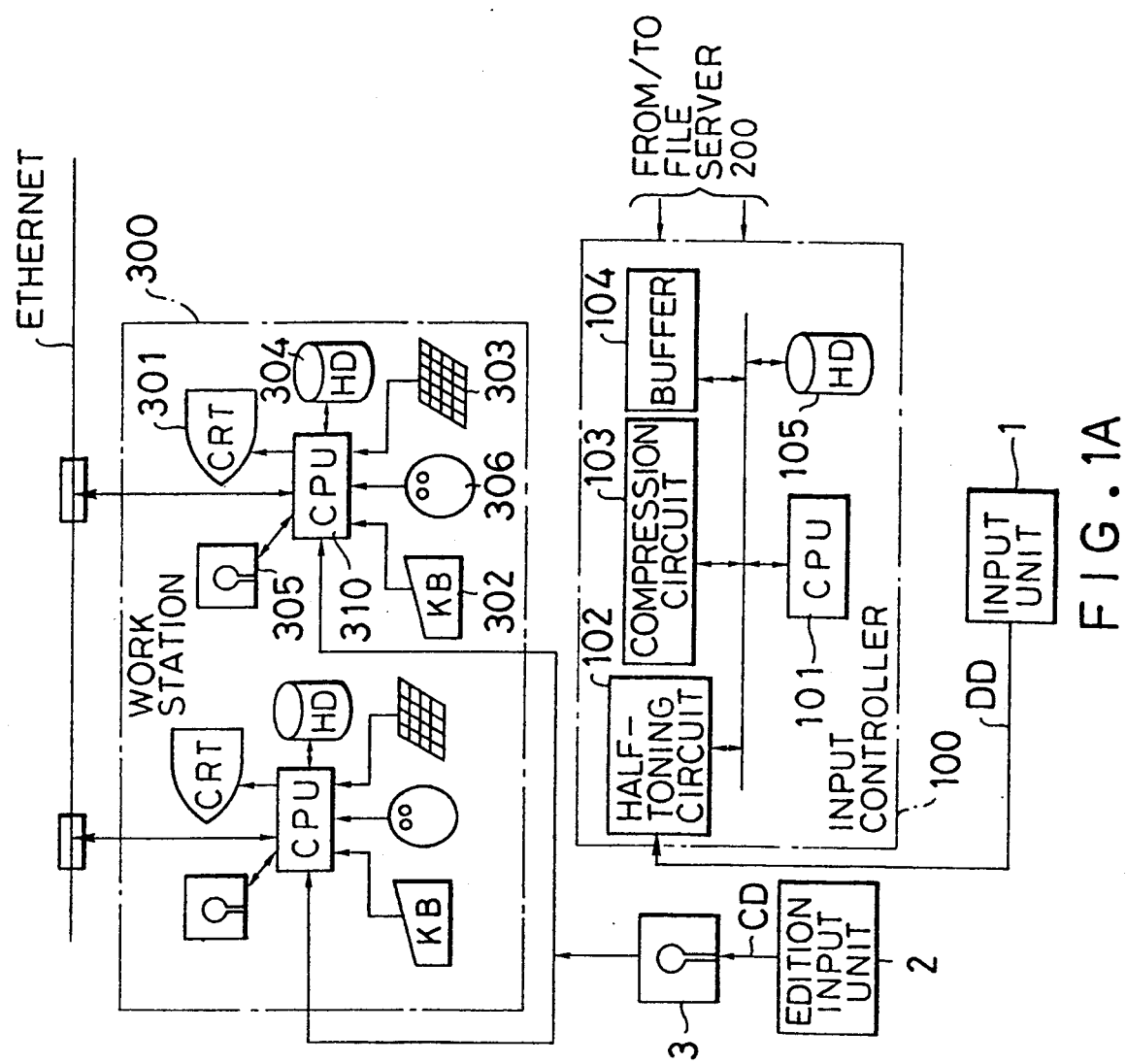
FIGS. 1A and 1B are block diagrams to show an example structure of an image processing system.
Figure 1B:
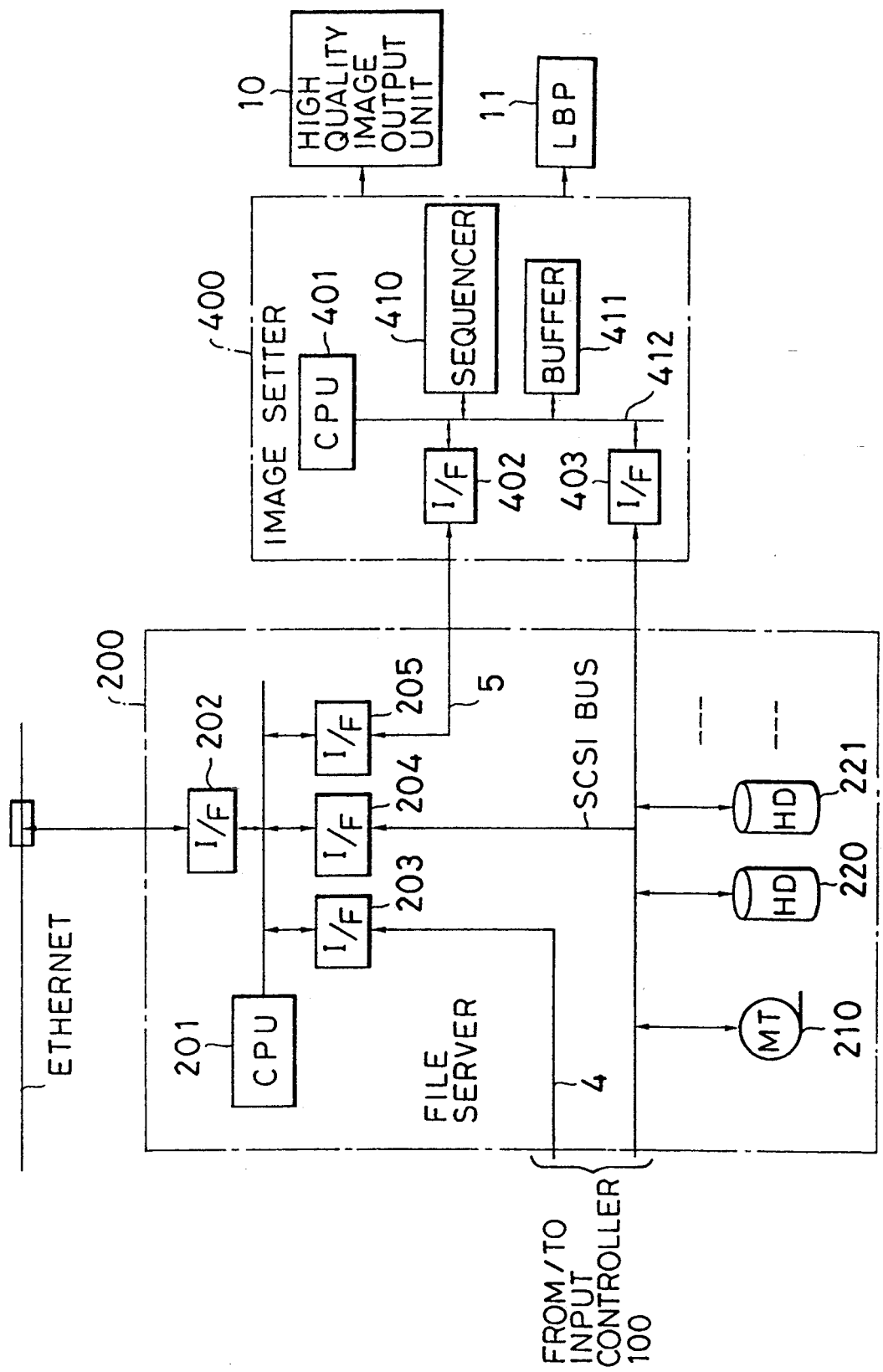

FIGS. 1A and 1B show an image processing system in block diagrams to which this inventive method is applicable. Originals such as image pictures, characters, figures and mechanical sheets are read out by an input unit 1 such as a scanner, and thus obtained density data DD of the images are inputted in an input controller 100. The input density data DD are converted into halftone dots by a halftoning circuit 102 in the input controller 100 via a CPU 101 contained therein, compressed by a compression circuit 103, temporarily stored in a buffer memory 104, and transferred to a file server 200 via an SCSI bus to be stored in a magnetic tape 210, or hard discs 220,221 . . . The input controller 100 has a local disc (hard disc) 105 for temporarily storing the data. The file server 200 includes a CPU 201, and is connected to other devices via interfaces 202 through 205. Code information CD such as characters obtained from an edition input unit 2 such as a word processor and a composer are read out from a floppy disc 3 after being temporarily stored therein, and inputted to a work station 300. Each work station 300 has plural sets of terminals including a CRT 301 as a display means, a keyboard 302, a mouse 306 and a digitizer SOS as input operation means, a hard disc 304 and a floppy disc 305 as memory means. Each work station 300 is connected to the file server 200 via ETHERNET. The image data, frame data and image data for contour display which are obtained from the input controller 100 and thinned for CRT display are stored in the magnetic tape 210 or hard discs 220,221 . . . together with the high density data for image output which are not thinned. The thinned data are read out via the SCSI bus, and transferred to the work station 300 via interfaces 204 and 202 while control commands from the input controller 100 are transferred via an auxiliary data line 4 to the interface 200 of the file server 200. The file server 200 is further connected to an image setter 400. The image setter 400 includes a CPU 401, is connected to an auxiliary data line 5 of the file server 200 via the interface 402, and is connected to the SCSI bus via the interface 403. The image setter 400 further includes a sequencer 410 and a buffer memory 411 which stores necessary data, and is connected to a high quality image output unit 10 for outputting high quality images and a laser beam printer (LBP) 11 for outputting images of relatively low quality images. The hard discs 220, 221, . . . store in advance fixed data (bit map data) such as a logo, a crest and halftone dots and vector font data for character output.

The input unit 1 digitizes image pictures (halftone images), line drawings, and character images (binary images) into density data (8 bits/pixel). The signals of pictures inputted in 8 bits/pixel are converted into halftone dots by the input controller 100 to generate information of 4 bits/pixel. The binary images are converted into information of 1 bit/pixel. Characters are inputted from the work station 300 in codes, but sometimes are inputted in images from the input unit 1. When inputted as the images, the characters are also treated as images (bit map data). All the images are outputted by the image setter 400, but since all the codes and vector information are converted into the bit map data by the image setter 400, the term "image output" is used herein to express the output of the bit map data.

The input controller 100 is described in more detail referring to FIG. 2. The input controller 100 is adapted to process the density data DD inputted from the input unit 1 to generate five sets of data concurrently; i.e. high density data for the high quality image output unit 10, data for the laser beam printer 11, two types of data for display on the CRT 301 of the work station 300, and image data of a density low enough to express the contour. This is because the parallel concurrent processing can increase the speed of the whole system and the loads imposed on the CPU 101 for the data production and the operation can be decreased by hardware. More particularly, the high density data for the high quality image output unit 10 are converted into the halftone dots by a halftoning circuit 1021, compressed by a compression circuit 1031, and temporarily stored at a buffer memory 1041. As for data of relatively low image quality to be outputted by the laser beam printer 11, the density data DO are thinned (110) at a given interval (e.g. $\frac{1}{3}$), and the obtained lower density data are converted into the halftone dots by a halftoning circuit 1022, compressed by a compression circuit 1032, and temporarily stored at a buffer memory 1042. As for the two types of data of still lower density for the display on the CRT 301, the density data DD are thinned at a given interval and converted into the halftone dots by halftoning circuits 1023 and 1024, temporarily stored respectively at buffer memories 1043 and 1044. In the case of line drawings with which masks for outline finish are produced from the halftone images, image data are thinned (113) after they are processed for Laplacian operation or unsharp mask processing to express the contour data, and then binarized at a binarizing circuit 1025 to be temporarily stored in a buffer memory 1045.

With such construction as stated above, the CPU 101 communicates with the input unit 1 via data lines (not shown) and with the file server 200 via the auxiliary data line 4 and a dual port RAM (not shown). When requested for data transmission by the input unit 1, the CPU 101 sets data necessary for respective circuits as shown in FIG. 2, stores the set data in the local disc 105, and further sets values related to auxiliary scanning. The density data DD from the input unit 1 are inputted in the unit of one line and synchronized by respective circuits shown in FIG. 2 to be stored in the buffer memory 104 (1041 through 1045). Meanwhile, the CPU 101 checks the switching of the SCSI bus and of the output buffer memory 1041 for the data compression, and presence/absence of error information from various circuits. The data once stored in the buffer memory 104 and the local disc 105 are sorted in accordance with the command from the CPU 101 and outputted to the SCSI bus outside of the system.

The structure of the file server 200 is shown in FIG. 1B. The file server 200 functions to manage and share common files and to control communications between networks and among units. More particularly, the file server 200 manages files of the hard discs (220,221 ...) and the magnetic tape 210 via the SCSI bus, functions as a software interface with the work station 300 via an ETHERNET, serves for file management information for the input controller 100 and the image setter 400, and executes utility functions for the file management via the SCSI bus including for example, registration of fonts and garbage collection of the SCSI discs. There are two types of font registration; one is the registration of fonts included in the system which is executed by storing the vector fonts prepared by an outside font formation system in the hard disc of the image processing system in the form of magnetic tapes, and the other is the registration of fonts which are not included in the system. In this case, fonts prepared by other systems are registered in the system in the form of a floppy or a magnetic tape.

The file server 200 provides for the data transmission among the work station 300, the input controller 100 and image setter 400 and stores the data therefor, while the input controller 100 receives necessary information from the file server 200 for securing or deleting various files via the auxiliary data line 4 and the dual port RAM. In order to register the data once stored in the buffer memory 104 inside the input controller 100 as a file for the image processing system, information such as file name and file capacity, etc. should be transferred to the file server 200, and the hard discs 220,221 ... on the SCSI bus should be accessed. This makes the file server 200 to start directory communication and disc area management. The file server 200 transfers the file data to the work station 300 via the ETHERNET or receives data from the work station 300. Following the command from the work station 300, the file server 200 manages the hard discs on the SCSI bus (220, ... ) and the magnetic tapes 210 and renews necessary information such as directory. It also receives the commands for the image setter 400 and for the magnetic tape 210 and performs services according to the commands. It transmits given commands to the image setter 400 via the auxiliary line 5 and the dual port RAM, and transmits file management information to respond to the request from the image setter 400 so that the image setter 400 directly makes access to the disc data on the SCSI bus. Further, the utility information related to the image processing system as a whole including font information and common files of the system are managed in the hard discs 220, 221, ... on the SCSI bus.

Figure 3:
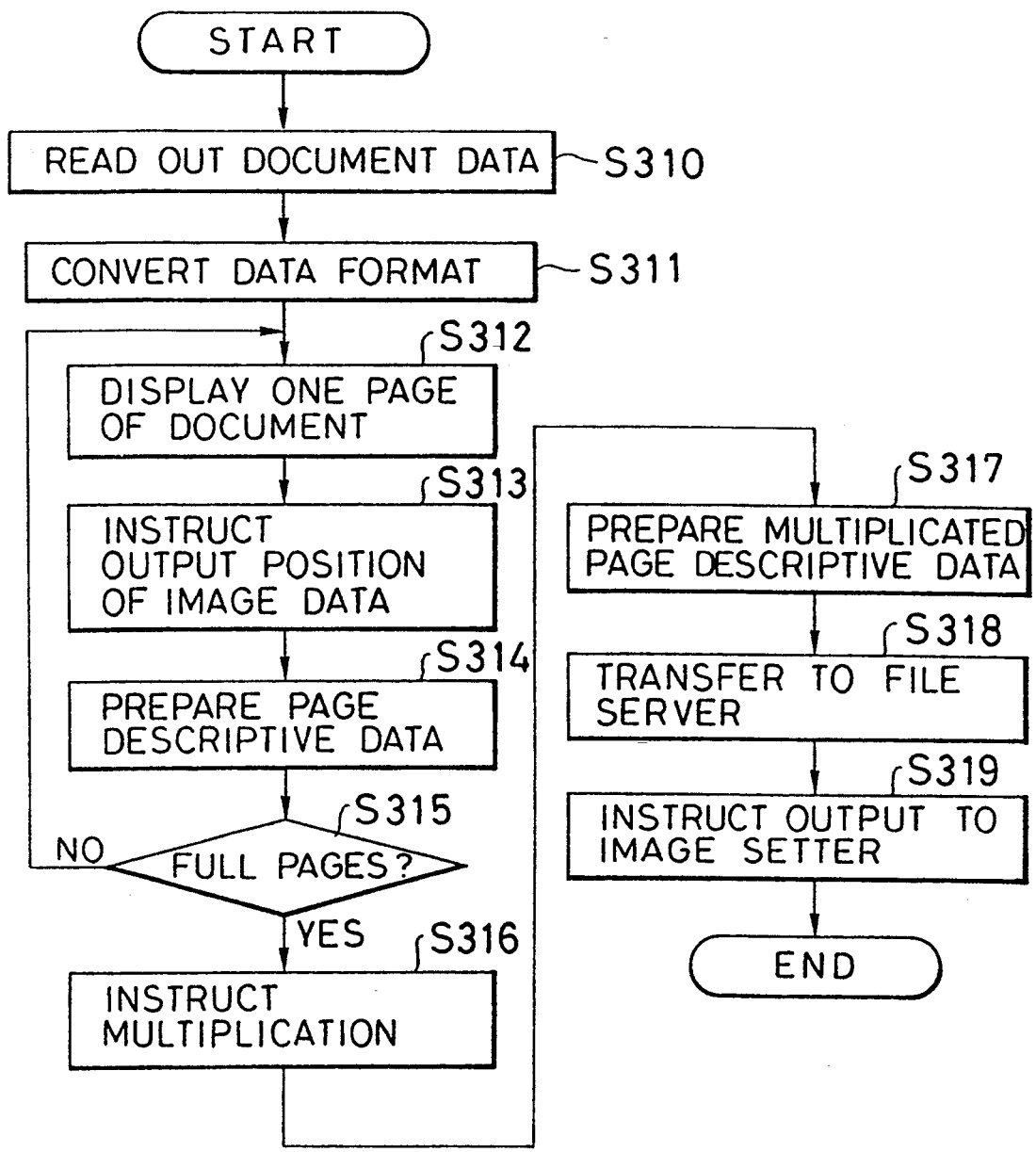
FIG. 3 is a flow chart to show an example of operation at the work station.

The operation of the work station 300 will now be explained referring to the flow chart in FIG. 3. The document data edited and stored by the edition/input unit 2 are read out from the floppy disc 3 (Step S310), and the code information CD of the document data is converted in terms of data format (Step S311). The content of the document is displayed in the unit of one page on the CRT 301 (Step S312), and the output positions of the images read out from the mechanical sheet or the like are designated with the mouse 306, a keyboard 302 and a digitizer 303 (Step S313) and page description data in the unit of one page with the frame of the mechanical sheet are formed (Step S314). Such data are prepared for all the pages (Step S315), and the layout for the printing block are instructed from the keyboard 302 (Step S316). The page description data with layout are prepared (Step S317). The prepared data are transferred to the file server 200 (Step S318), and the image setter 400 is instructed to output images, whereupon the operation is completed (Step S319).

Figure 4:
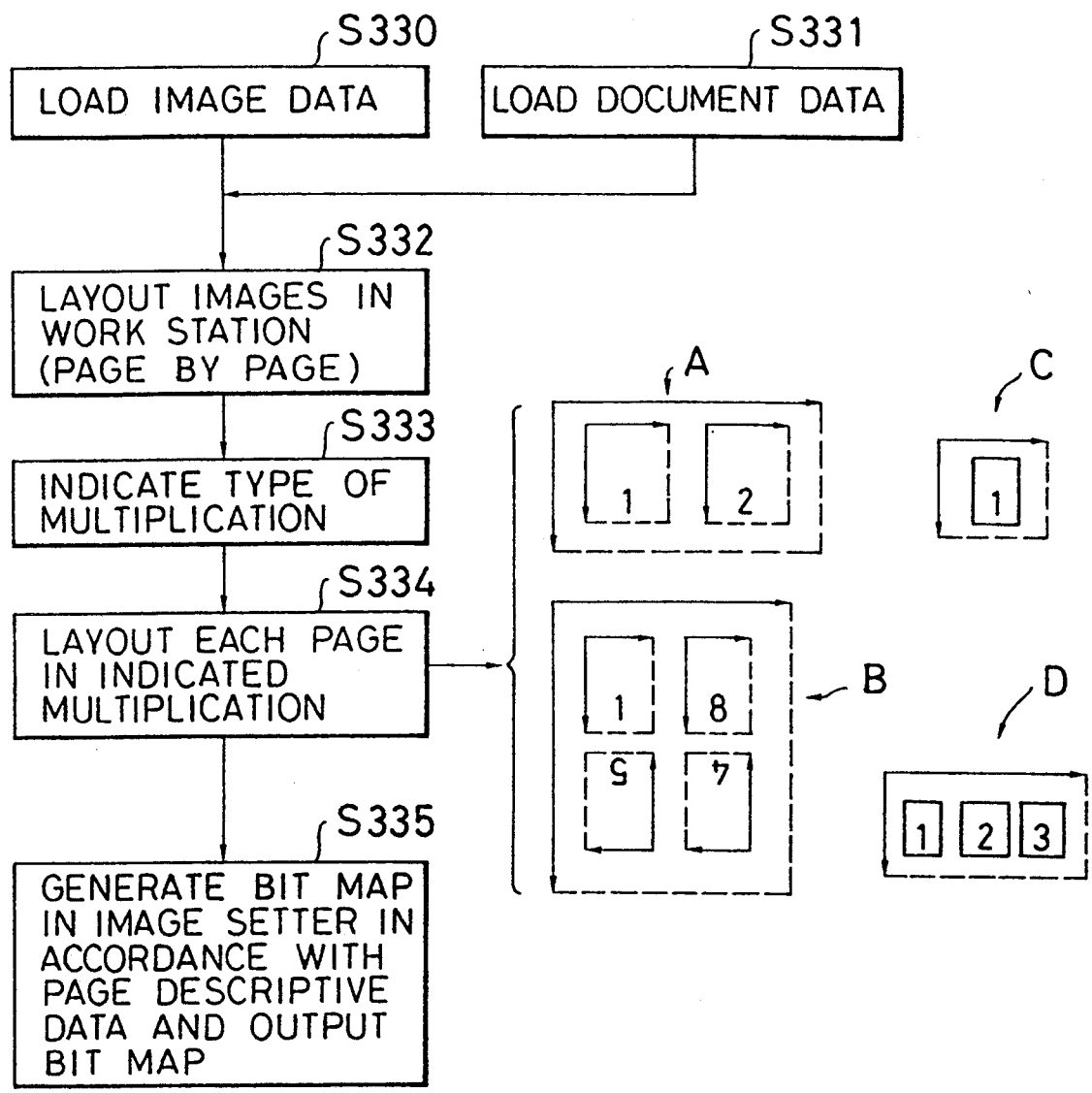
FIG. 4 is a flow chart to explain the operation of layout.

Referring to FIG. 4, an example of the operation at the time of page composition will now be described. The image data which have been thinned from the hard discs 220, 221, ... of the file server 200 are read-in (Step S330), the document data from the floppy disc 3 are read-in (Step S331), the necessary information are displayed on the CRT 300 of the work station 300, and layout of images, texts, and frames for each page is arranged using the mouse 306, the keyboard 302 and the digitizer 303 (Step S332). A particular type of page composition which is stored in advance is selected from the keyboard 302 (Step S333), and pages with the selected composition (e.g. A through D in the FIG. 4) are displayed on the CRT 301 with pagination (Step S334). The page compositions are stored with pagination in advance with due consideration of the folding of sheets at the time of book binding such as 4 pages in A4 size or 8 pages in A5 size. By selecting and designating an appropriate one from the storage, a page composition with pagination is displayed (for example, in B in FIG. 4, "1", "8", "5" and "4"). As shown in the figure, the content such as pattern and character images are not displayed. Instead, bit map data are generated and outputted by the image setter 400 based on the page descriptive data (Step S335).

Figure 5:
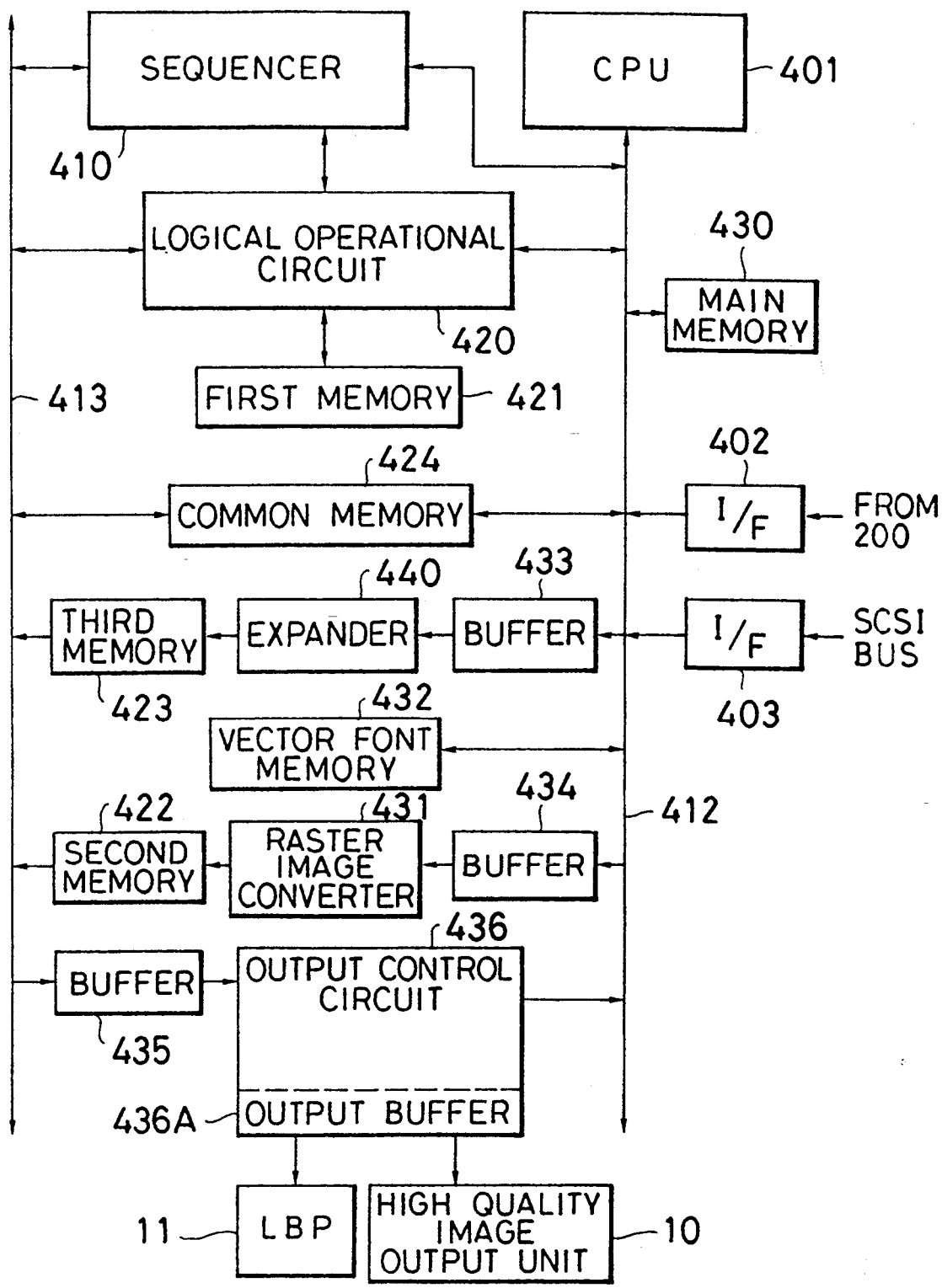
FIG. 5 is a block diagram to show the structure in detail of an image setter.

FIG. 5 shows an example of the structure of the image setter 400 wherein the sequencer 410 is connected to a CPU bus 412 and an image data bus 413 as well as to a logical operational circuit 420 and a first memory 421. The CPU bus 412 is connected to the main memory 430 for the CPU 401. A common memory 424 is connected between the CPU bus 412 and the image data bus 413, and the outputs from the interfaces 402 and 403 are inputted to the CPU bus 412. Between the CPU bus 412 and image data bus 413 are connected a buffer memory 433, an expander 440, and a third memory 423 as well as a buffer memory 434, a raster image converter 431 and a second memory 422 and a buffer memory 435 and an output control circuit 436. The CPU bus 412 is connected with a vector font memory 432 while the output control circuit 436 is connected with the high quality image output unit 10 and the laser beam printer 11 via the output buffer memory 436A. The vector font memory 432 stores the vector fonts necessary for producing a character bit map by the raster image converter 431. The vector fonts are usually stored in the hard discs (220,221, . . . ), but it would deteriorate efficiency if the vector fonts have to be read out through the SCSI bus every time the character bit map is formed. According to this invention, therefore, all the necessary vector fonts are read in the vector font memory 432 to improve the speed of the character bit map formation.

Figure 6:
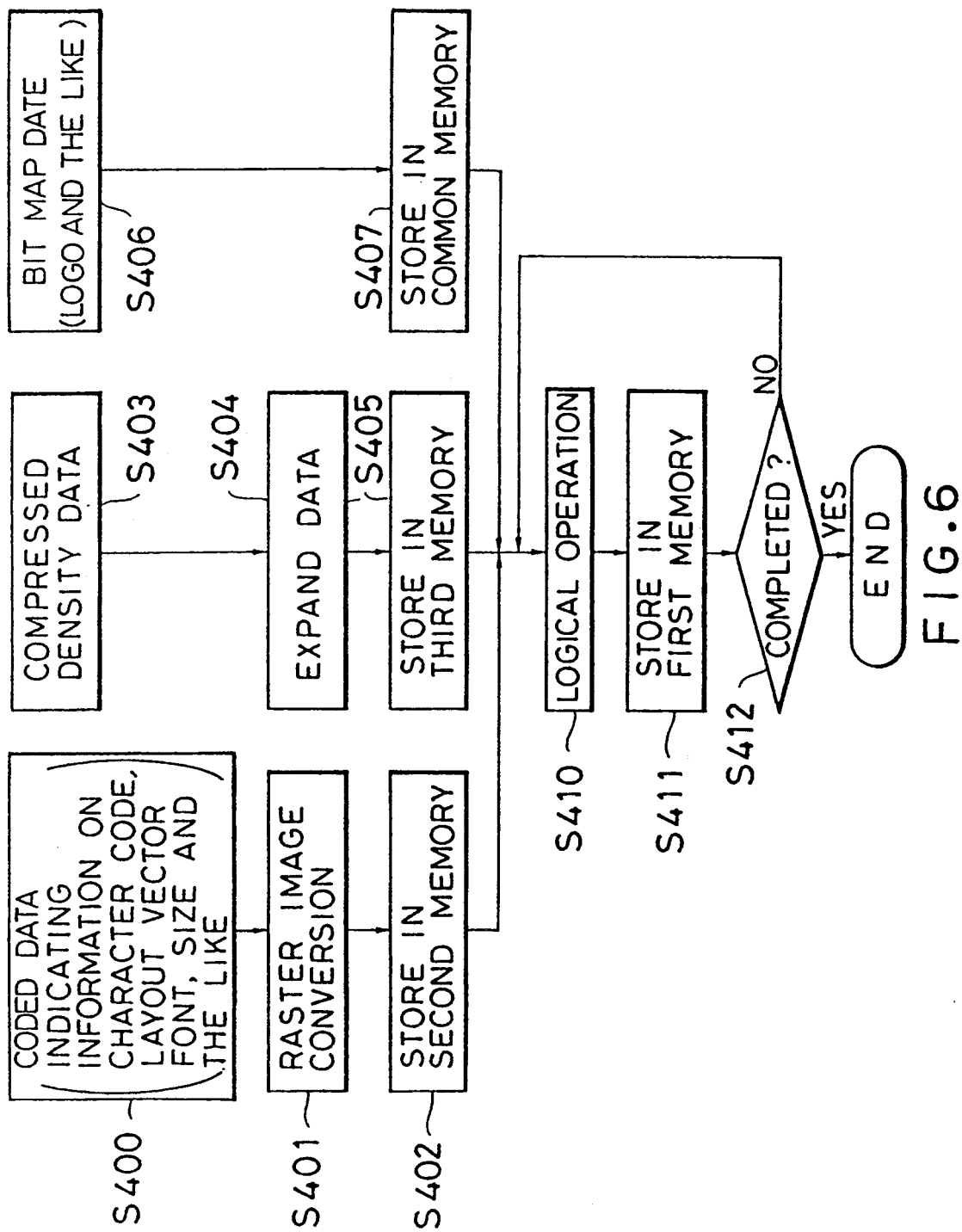
FIG. 6 is a flow chart to show an example of operation at the image setter.

As shown in FIG. 6, a request for a command is outputted from the file server 200 via the auxiliary data line 5 to the image setter 400 using the file names in the hard discs 220, 221, . . . as parameters. The files are written with specifications to be outputted. The specifications are sequentially read, and the code data and the compression data are address-calculated for each unit image, and the addresses are over-processed repeatedly by the logical operation. The result of the processing is stored in the first memory 421. The image setter 400 calls up parameter file via the SCSI bus and repeats the operation. For example, in the case of the code data, information such as the character code, the position, the type face and the size are inputted via the SCSI interface 403 (Step S400), converted into raster images at the raster image converter 431 via the buffer memory 434 (Step S401) and stored in the second memory 422 (Step S402). The compressed image data are inputted via the SCSI bus and the interface 403 (Step S403), expanded by the expander 440 to be restored after passing through the buffer memory 433 (Step S404) and stored in the third memory 423 (Step S405). The bit map data such as logo sorted in the hard discs 220,221, . . . are inputted via the interface 403 (Step S406) and stored in the common memory 424 (Step S407). All the data stored in the second memory 422 through the common memory 424 are the bit map data to be logically operated by the logical operational circuit 420 via the CPU 401 (Step S410). The data logically operated for syntheses or editing of pictures or texts, or for the image processing are stored in the first memory 421 (Step S411). After the data are stored in the first memory 421, whether or not an alternation or addition is necessary is judged (Step S412) and operations mentioned above are continued until all the logical operations including alternation and modification are completed. The logical operational circuit 420 executes in cooperation with the CPU 401 logical operations of the bit map data produced from the code data such as the characters, the bit map data obtained by expanding the compacted image data and the sum, the product, the difference, the exclusive-OR, etc. of the bit map data to produce the image information to be outputted to the high quality image output unit 10 or the laser beam printer 11.

Figure 7:
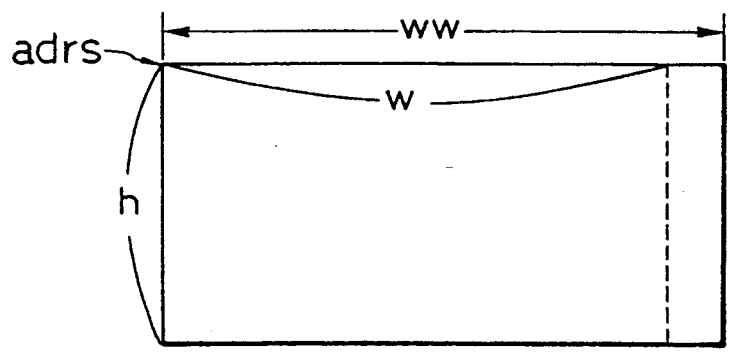
FIG. 7 is a view to explain a region definition according to this invention.

The function of noise detection according to this invention comprises region definition which is to be described hereinafter and the following Steps 1 and 2. In the region definition, the bit map or the object of the noise detection is defined by width (w), height (h), number of words/line (ww) and the head address (adrs) as shown in FIG. 7. Each parameter means the following.

w: number of bits in the width of the object region of the noise detection.
h: number of lines in the height of the object region of the noise detection.
ww: number of words in one line in a region including the object region of the noise detection.
adrs: address (byte address) of the word including the left top pixel in the object region of the noise detection.

Step 1

Figure 8:
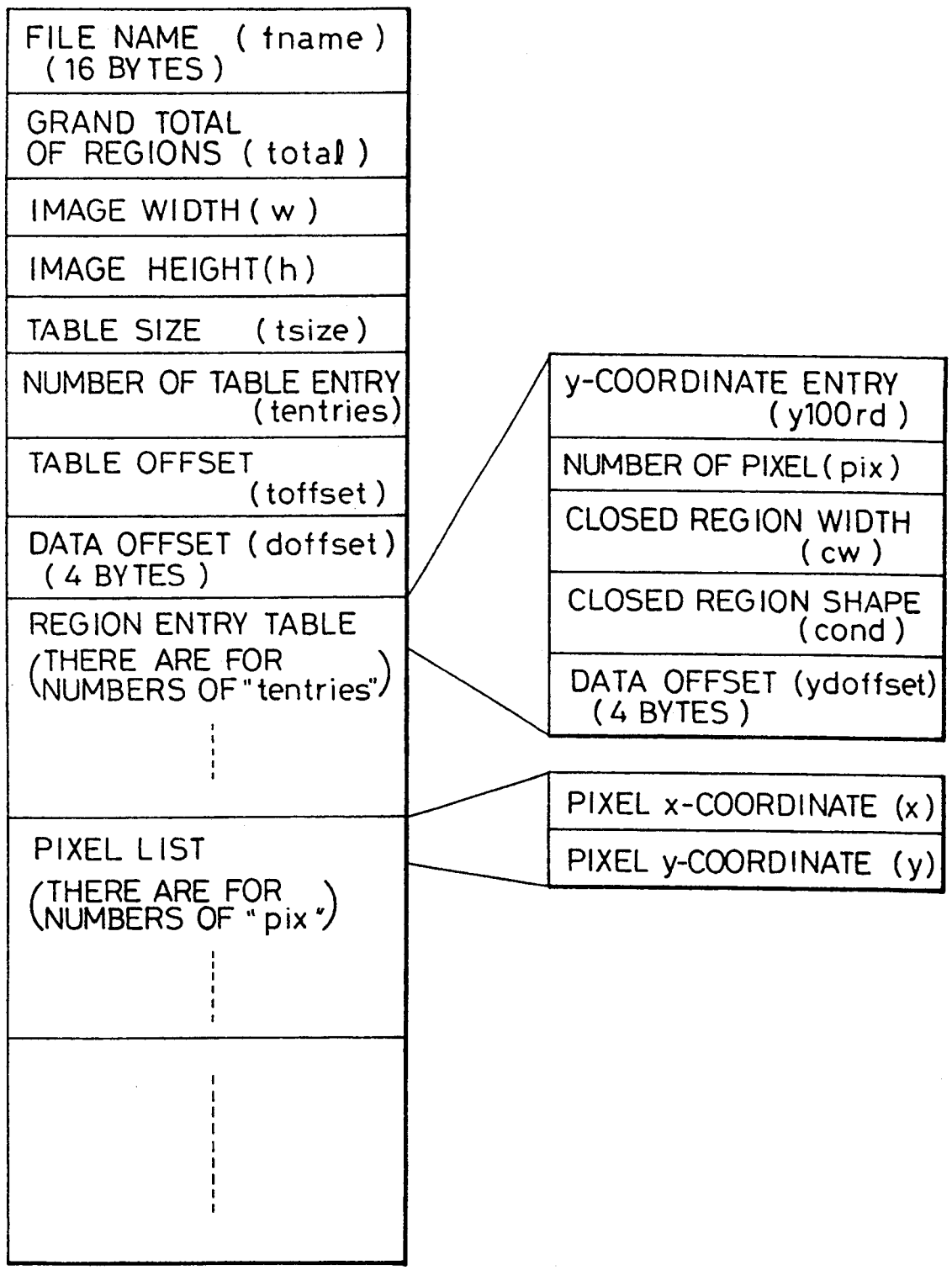
FIG. 8 is a view to show an example of a closed region list format.

A region which is the object of the noise detection is scanned to detect a closed region having the perimetric length (L) of less than a predetermined value. The format for the closed region list is shown in FIG. 8.

Step 2

Figure 9:
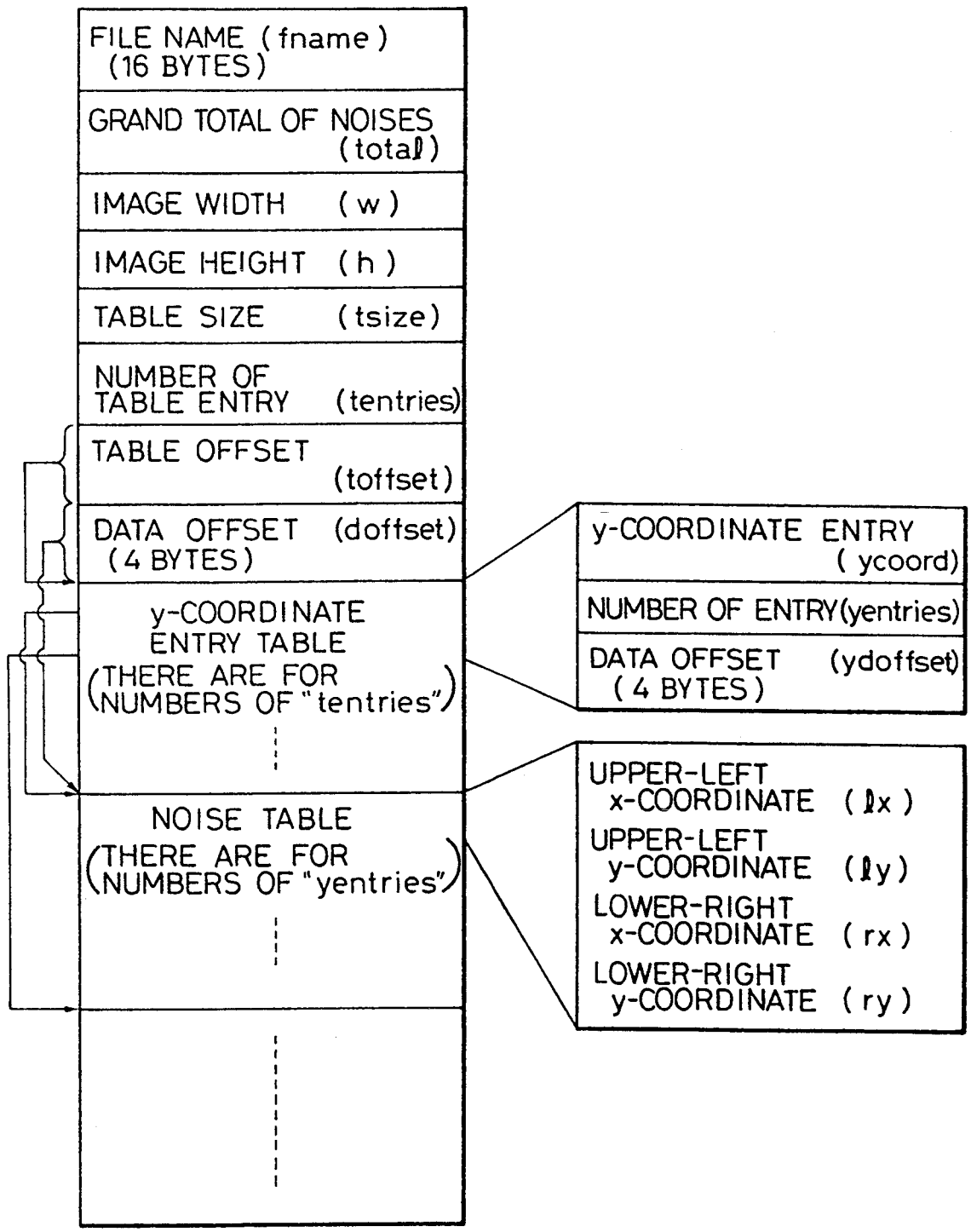
FIG. 9 is a view to show an example of a noise list format.

A noise list is formed out of the closed region list formed by the above first Step 1 according to the noise judgement criteria which is to be explained hereinafter. The format of a noise list is shown in FIG. 9.

The above region definition is conducted in the memory of the work station for each parameter, the closed region list of the first Step 1 is formed, and then the noise list is formed in the Step 2. The entry table of the y-coordinates is sorted as "ycoord". The noise table need riot be sorted by the upper-left coordinates or "lx".

Criteria for the noise judgement in the Step 2 above include the number (pix) of pixels in a closed region, the flattening obtainable from the ratio of length against width of the closed region and the curvature r as shown in FIG. 10. The horizontal axis x represents the flattening which is obtained by (the short side/the long side)×100%. As FIG. 11A has the length "2" for the short side and "3" for the long side, the flattening is $\frac{2}{3} \times 100 = 66.7\%$ while as FIG. 11B has the length "1" for the short side and "3" for the long side the flattening becomes $\frac{1}{3} \times 100 = 33.3\%$. The FIG. 11C has the length "2" for the short side and "4" for the long side, and the flattening becomes $2/4 \times 100 = 50\%$. As stated above, a hyperbola of the curvature r with asymptotes a and b is established with respect to the orthogonal axes of the flattening (x) and the number of pixels (y) as shown in FIG. 10. The hatched area is judged as noises. This method realizes effective erasing of the noises because the thin and elongated noises such as traces of mounting concentrate in areas near the area A while minute noises such as dust concentrate in areas near the area B. The form of the hyperbola may suitably be changed simply by inputting the values a and b and the curvature r which determine the asymptotes. Because the unit system of the coordinates of the noise list is the unit system of output pixels, it is necessary to designate pixel density of the bit map with which the noise is detected. According to this invention method the pixel density of the bit map is expressed in i bit pixel/ram, and the density of the output pixel in bit pixel/density.

The steps of the algorithm of this invention will briefly be explained below.

Figure 12:
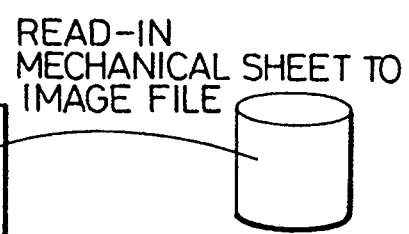
FIG. 12 is a view to show how a mechanical sheet image bit map is copied into a memory.

(1) As shown in FIG. 12, a mechanical sheet image bit map is copied into a memory. The memory region is referred to as an original region S.

Figure 13:
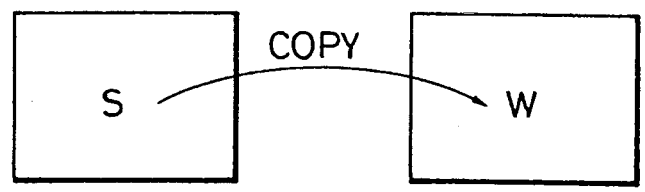
FIG. 13 is a view to show how an original region S is copied into a contour region W.

(2) A contour region W of the same size as the original region S in the memory is secured and the original region S is copied into the contour region W (see FIG. 13).

Figure 14:
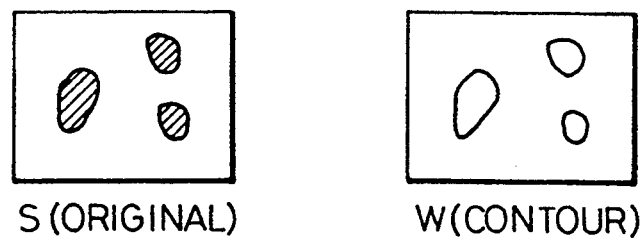
FIG. 14 is a view to show how a contour bit map is prepared.

(3) Using the original region S and the contour region W, a contour bit map of the original region S is prepared in the contour region W as shown in FIG. 14.

Figure 15:
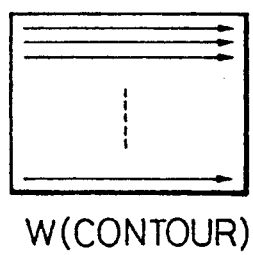
FIG. 15 is a view to show scanning of the contour bit map.

(4) As shown in FIG. 15, all the pixels of the contour bit map in the contour region W are scanned from the left-top corner to the right-bottom corner.

(5) As shown in FIG. 16B, when a black pixel (a part of the contour) is detected in the scanning of the contour region W, the steps ① and ② below will be taken.

① The bit map figure (the circular bit map in FIG. 16A) is traced from the pixel at the same position in the original region S as the position (x, y) of the black pixel detected in the contour region W. The symbol BP in FIG. 16B indicates the black pixel which is detected first.

② As to the same coordinates as the ones traced in the contour in the above step ①, data on 8-neighboring pixels in the contour region W are obtained, and the traced coordinate values and the data on the 8-neighboring pixels are stored in a memory. Concurrently, the black pixels in the obtained data on the 8-neighboring pixels are replaced with white pixels (in other words, the contour is erased). This operation is repeated until it returns to the original coordinates (x, y). It should be noted that data on the coordinate values and the 8-neighboring pixels that can be stored in the memory are limited to a predetermined number (the maximum length "MAXLENGTH" which is judged as noises is usually set at "50"). In the original region S in FIG. 17, the contour is traced from the coordinates (x, y) to the coordinates (x', y'), and is erased as shown with the broken line in the contour region W.

(6) The operation of the contour tracing is repeated until it returns to the starting point (x, y). Then, the length of the contour is examined. If the relation holds that the contour length is longer than the maximum length "MAXLENGTH", the contour is judged not a noise, and the scanning is resumed starting from the adjacent pixel (x+1, y) (in other words, the process should return to the (5) above). However, if the relation holds that the contour length is equal to or less than the maximum length "MAXLENGTH", the step (7) below is followed to register the contour as a candidate for a noise.

(7) The data stored in the memory are converted into noise coordinate data and added to the noise list. The data stored in the memory are the coordinate axes and the data on the 8-neighboring pixels in the order along the contour. The data are converted into noise block information as shown in FIG. 18.
① The upper-left coordinates (minx, miny) and the lower-right coordinates (maxx, maxy) of a rectangle surrounding a noise
② The grand total number of the pixels
③ The perimetric length
④ The flattening of a closed region shape
⑤ The coordinates of "minx" and "maxx" of each line The above data are registered in the noise list, and the scanning is resumed starting from the adjacent pixel (x+1, y) (then, the process should return to the above step (5)).

(8) When all the scannings are completed, the registered noise list is converted into files (see FIGS. 8 and 9 for the format of the files)

Figure 19:
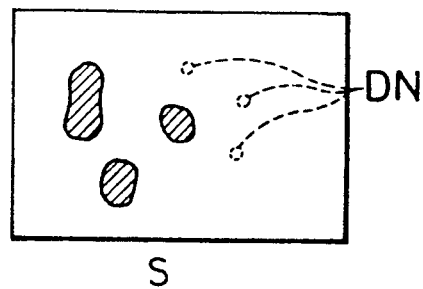
FIG. 19 is a view to explain noise erasing.

(9) The noise data meeting the conditions of the noise to be removed are taken out from the noise list files, and noises on the original region S are removed as shown in FIG. 19. The symbol DN in FIG. 19 indicates the erased noises.

Figure 20:
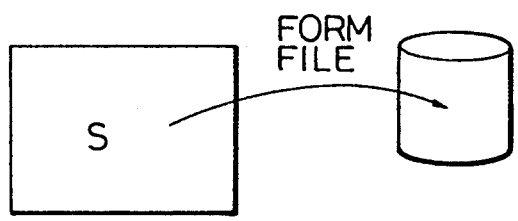
FIG. 20 is a view to show formation of a mechanical sheet image which has been erased of noises.

(10) The data on the original region S are written in a disc to prepare a file as shown in FIG. 20 to form images without noises.

Figure 21:
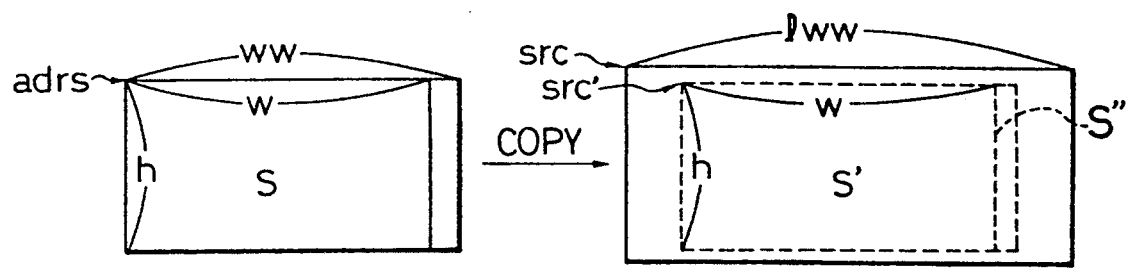
FIG. 21 is a view to explain the conditions of a region.

The above explains the outline of the operations according to this invention method. Each operation will now be described in more detail. The basic condition of a region are the contour tracing by extraction of 8 pixels in the neighborhood of an objective pixel. To facilitate the extraction, the whole images are copied in a region larger than the object region. To simplify the operation, one line each is added at the top and the bottom. Then, 32 bits (one long word) are added to the left side and 0 to 31 bits to the right side so that the data amount of one line becomes a multiple of an integer of a long word (4n bytes). As shown in FIG. 21, the original region S (adrs, w, h, ww) is copied in a modified region S' (src, w, h, lww). The added regions are all cleared zero. A region S" (src', w, h, lww) with the origin set at the position (32, 1) in the modified region S' is defined and is processed subsequently as the original region S.

Figure 22:
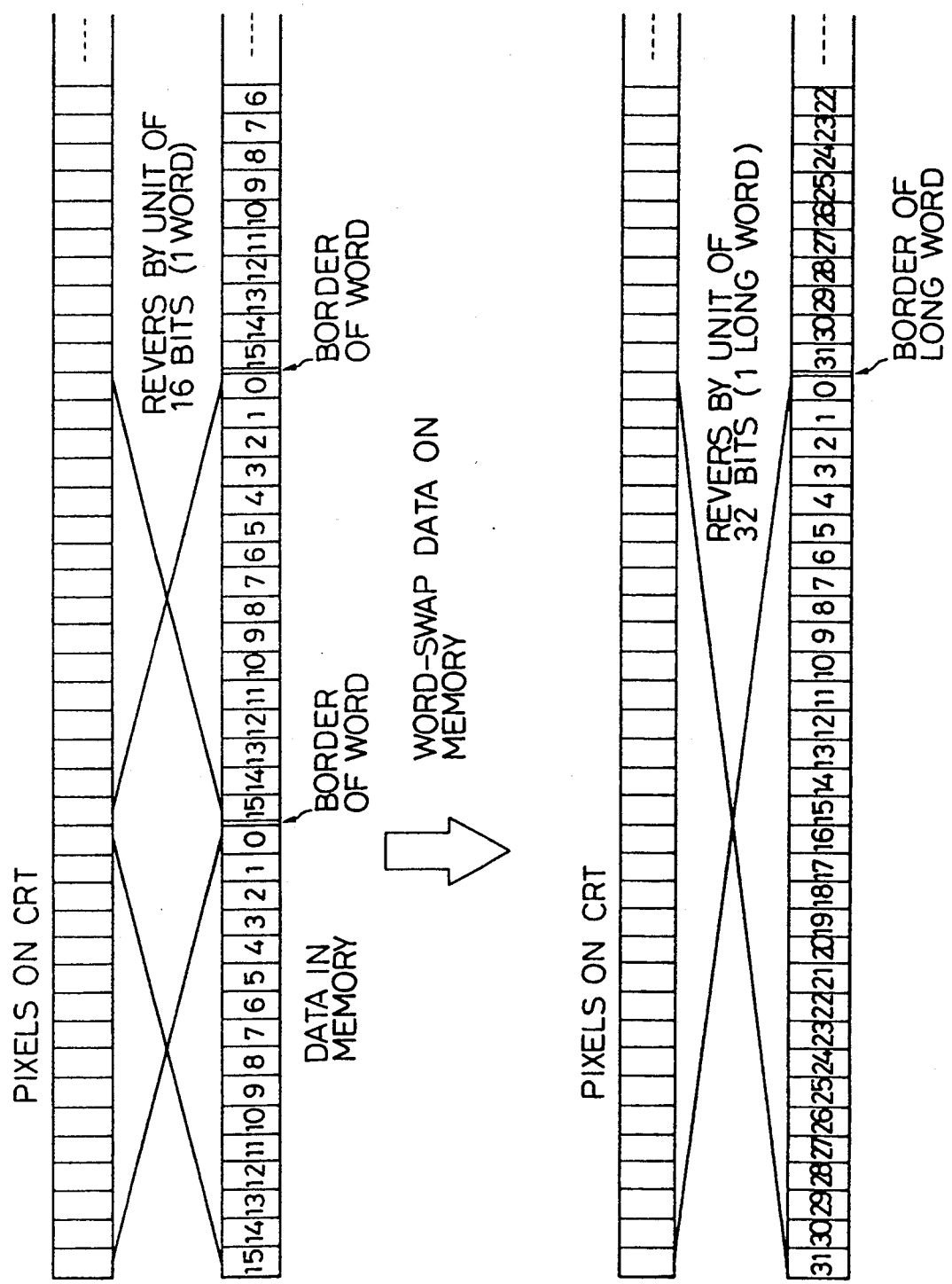
FIG. 22 is a view to explain word swapping.

Although the bit map data of images are made in the unit of a word (16 bits) in order to be displayed on the CRT 301, it is more efficient to use a bit map in the unit of a long word (32 bits) on a CPU with 32 bits. In this invention method, the bit map data processing is hereafter treated as the long word bit map processing. It is therefore necessary to swap the long words of higher orders with those of lower orders in the original region S. FIG. 22 shows the word swapping of the data in the memory.

Figure 23:
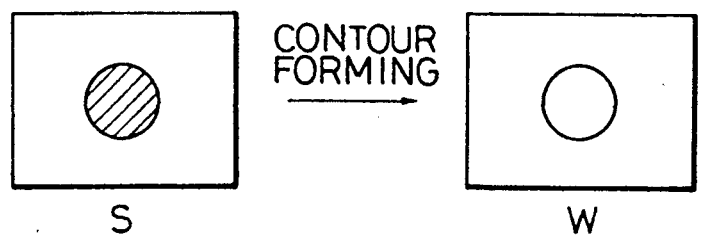
FIG. 23 is a view to explain formation of a contour.
Figure 24:
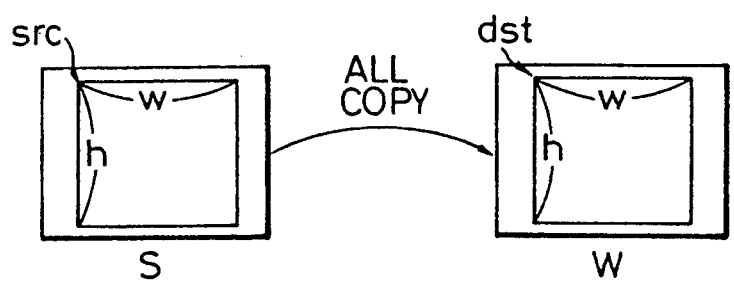
FIG. 24 is a view to explain copying of an original region.
Figure 25:
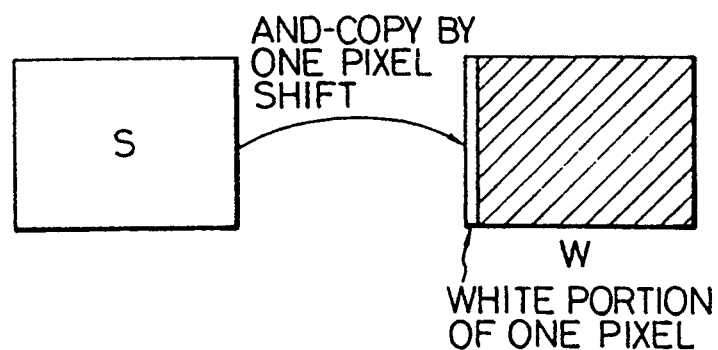
FIG. 25 is a view to explain AND-copying into a contour region.
Figure 26:
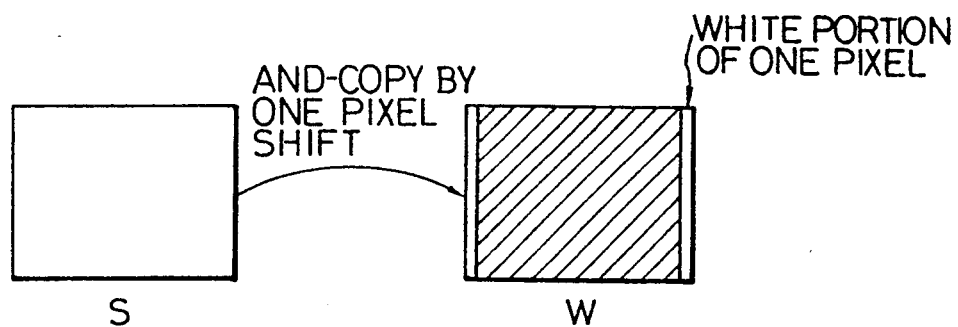
FIG. 26 is a view to explain AND-copying by shifting by one pixel.
Figure 27:
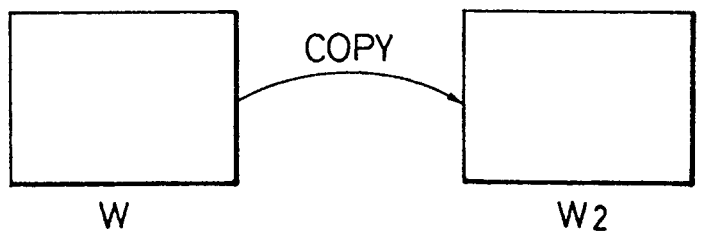
FIG. 27 is a view to show copying of the contour region W into W2.
Figure 28:
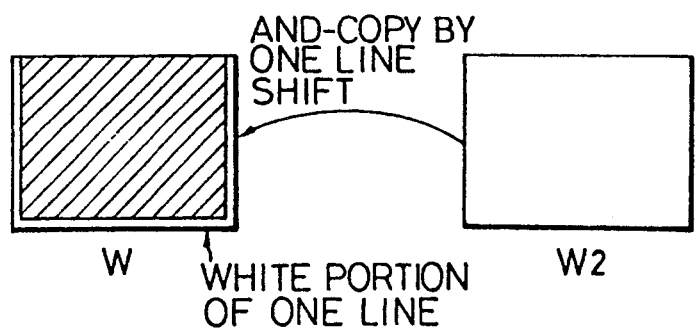
FIG. 28 is a view to explain AND-copying into the contour region W by shifting by one line.

The method of contour forming will now be described for the case where one pixel contour bit map W (dst, w, h, lww) is formed from the bit map image data S (src, w, h, lww) shown in FIG. 23. First of all, a contour region W of the same size as the original region S is secured as shown in FIG. 24, and the original region S is copied into the contour region W. Then, the original region S is shifted to the right by one bit and AND-copied into the contour region W as shown in FIG. 25. The one pixel on the left side of the region W is made white. The hatched portion of the contour region W is the region for AND-operation. The original region s is then shifted to the left by one bit and AND-copied into the contour region W, and one pixel on the right side of the region W is made while as shown in FIG. 26. Then, a region W2 of the same size as the original region W is secured as shown in FIG. 27, and the region W is copied into the region W2. The region W2 is shifted upward by one line and AND-copied into the contour region W as shown in FIG. 29, and one line at the bottom of the contour region W is made white. Further, the region W2 is shifted downward by one line and AND-copied into the region W2, and one line on the upper edge of the contour region W is made white. The region of the region W2 is then released, and the original region S is copied by exclusive-OR (EX-OR) into the contour region W. As a result, the contour bit map of one pixel is left in the contour region W.

Figure 32:
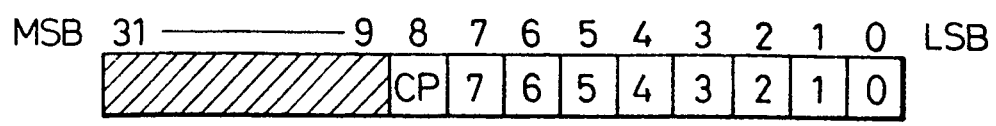
FIG. 32 is a view to explain assignments of bits within a word.

The data on the 8-neighboring pixels mean the data on the region of 3×3 pixels around an objective pixel. According to this invention, chain codes "0" through "7" are assigned to the 8-neighboring pixels surrounding an objective pixel CP as shown in FIG. 31. For the case where data on the 8-neighboring pixels are displayed in terms of one word (or one long word), pixels are allocated to bits in a word as shown in FIG. 32. In FIG. 32, the bits in the hatched portion are all zero.

When this invention is packaged in a device, the objective pixel is expressed by the structure like a formula (1) below instead of the coordinates (x, y) in order to increase the speed.

Figure 33:
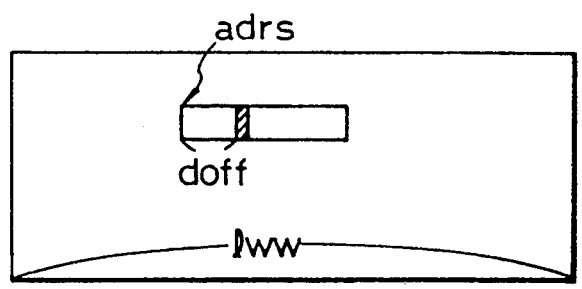
FIG. 33 is a view to explain the operation for obtaining the 8-neighboring pixels.

```
struct PIXADRS{
    unsigned long*adrs:
    unsigned int boff:
    unsigned int lww
}:                                    ......(1)
``` wherein "adrs" denotes the address (pointer) of a long word including the objective pixel, "boil" the offset in the long word of the objective pixel, and "lww" the number of the long words in one line of the region, or the difference expressed in long word between the objective pixel and the long word including the pixels in the neighborhood.
When an objective pixel is given in the above structure, the processing is optimized with the value of "boil" of FIG. 33 in order to obtain the 8-neighboring pixels at a high speed.

The contour tracing is a general method of assigning the chain codes "0" to "7" to the 8-neighboring pixels surrounding the objective pixel CP. According to this invention, however, as the method is quite special in that tracing is conducted for the contour of the original bit map only after the contour pixels are found by scanning the contour image, the method requires special steps to be taken for the first point.

Figures 34A, 34B:
FIGS. 34A and 34B are views to explain the contour tracing method using chain codes.

The chain codes "0" to "7" are assigned to the 8-pixels surrounding the objective pixel CP. For instance, in FIG. 31, if the immediately proceeding objective pixel existed in the direction of the chain code "3", the pixels of the chain codes are examined in the order of "4, 5, 6, 7, 0, 1, 2, and 3", and the pixel which is found to be the first black pixel becomes the next objective pixel. In the case of FIG. 34A, the next objective pixel is in the direction of the chain code "6" while in the case of FIG. 34B, the next objective pixel is in the direction of chain code "3" again.

Figure 35:
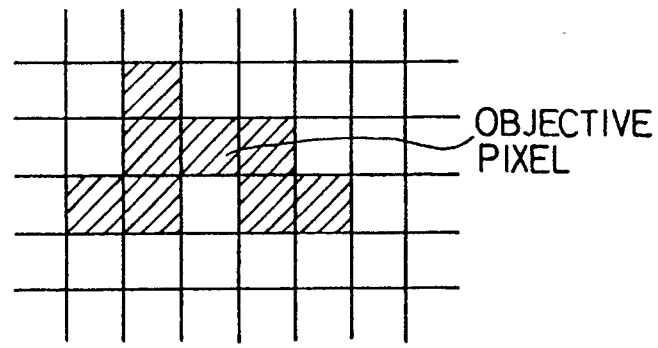
FIG. 35 is a view to explain the processing of the origin.

If the contour tracing is started anew, as there is no immediately preceding objective pixel, the pixel in the chain code "4" is virtually selected as the immediately preceding objective pixel in order to obtain the next objective pixel. However, in the case of FIG. 35, the next objective pixel becomes the chain code "5" (correctly, the pixel of the chain code "7") to mislead the processing. In order to deal with the above, the next objective pixel must be located by the following flow of steps only in the case of the starting point.

If "the pixel on the left of the objective pixel is black", then "examine the pixels from the one on the left of the objective pixel counterclockwise, and scan until a white pixel is found. Then scan them counterclockwise, and the first black pixel found is made the next objective pixel."

else

"scan pixels counterclockwise from the pixel on the left of the objective pixel and the first black pixel found is made the next objective pixel"

Figure 36A:
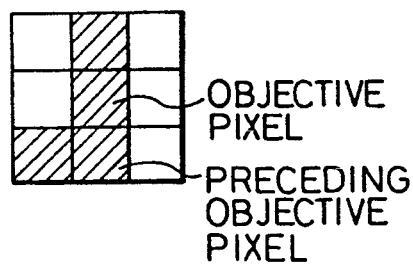
FIGS. 36A and 36B are views to explain a chain code table.
Figure 36B:
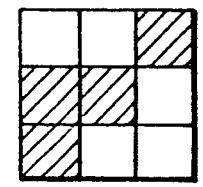

A table for retrieval should be prepared in advance in order to increase the speed of the steps to obtain the data on the 8-neighboring pixels and the chain code of the next objective pixel on the basis of the immediately preceding objective pixel. This invention method requires two tables as it involves two different procedures for the starting point and those other than the starting point. The tables to prepare are (1) int start_chain [512]; and (2) int next_chain [9] [512];, the former of which is for retrieval of the chain code of the starting point and the latter for the retrieval of the chain codes of the points other than the staring point. The first index of the second table is the chain code of the present target pixel when viewed from the immediately preceding target pixel, and the second index is the data on the 8-neighboring pixels around the target pixel. The table for the starting point is prepared for the index of the data on the 8-neighboring pixels alone (the immediately preceding pixel is always on the left). For example, given the chain code "2" as immediately preceding the pixel and FIG. 36A as the data on the 8-neighboring pixels, then the chain code of the next target pixel is "2", thus the relation holds as next_chain [2] [0×164]=2. Besides. "OX" represents hexadecimal value. As for the 8-neighboring pixel data in FIG. 36B, the chain code of the starting point is "1", and the relation holds as start_chain [0×132]=1. Images to be scanned are thinned to increase the processing speed. The thinning may be "OR"-thinning.

According to this invention, there arc three ways to designate the image area from which noises are to be removed;

(1) designate the image frame
(2) designate in terms of the noise erasing area (3) designate in terms of the rectangle/point eraser The object of designating the image frame is to erase the noises from the entire image data at a given level, and this function allows a frame in which line images are arranged can be designated for the noise erasing. The images may be mechanical sheet images or part images. When the noise level is determined by the image number sheets, and when a completion is instructed, the image data are processed for the noise erasing after closing the sheet. Then, the images from which noises have been erasing at the designated level are displayed. The items set for the noise erasing are noise size and noise shape, and can be settled only when the noise mode is switched "OFF". By similar operations, the frames on which images have already been arranged may be changed in the level.

Figure 37:
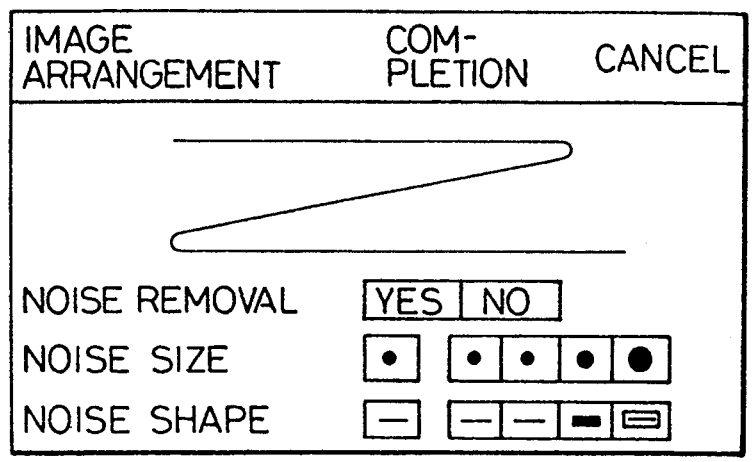
FIG. 37 is a view to show an example display of an image arrangement sheet.
Figure 38:
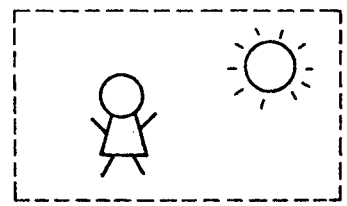
FIG. 38 is a view to show an example of images which have been erased of noises.

The sequence of the operation will be as follows: an image arrangement command is first selected, whereby the image arrangement sheet as shown in FIG. 37 is displayed. Then, the image number of the sheet is designated, "YES" is selected on the noise erasing items, and the predetermined positions, the noise size, and the noise shape are respectively designated. Lastly, the completion of the sheet is instructed, to display the images arranged in the frame as shown in FIG. 38 which have been processed for the noise erasing as instructed. When the images of the number designated do not satisfy the conditions of ① it is not a line drawing, and ② the image data are not on the work station/hard disc, an error message ("noise erasing command has been cancelled") is displayed and the noise erasing is cancelled. A similar sequence of operation is followed for the mechanical sheet images.

Figure 39:
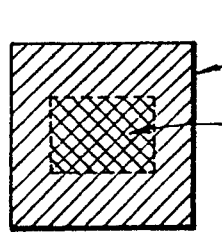
FIG. 39 is a view to explain the order of priority of the noise erasing.
Figure 40:
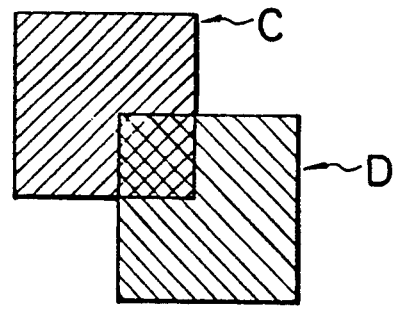
FIG. 40 is a view to explain overlapping of noise erasing areas.

Designation of a rectangle region (noise erasing area-)is intended for the noise erasing of a part of image data at a given level. More particularly, the region for the noise erasing is designated in a regular rectangle; the position and size of a region are set arbitrarily. However, the shape is limited to regular rectangles. The images to be processed may be either the mechanical sheet images or the part images. Frames that are selected when the noise mode is selected alone can be processed, and the processing is possible only when the noise mode is "ON". The noise erasing designated in terms of an area has a higher priority than that designated in terms of an image frame. The area A in FIG. 39 indicates that frame of the mechanical sheet is designated for the noise erasing of level "3", while the area B indicates that a rectangular area is designated for the noise erasing of level "1". In other words, it means that the noise erasing of level "3" is to be executed in the outer portion, and the noise erasing of level "1" is to be executed in the inner portion. When the areas overlap, the overlapped areas are subjected to the noise erasing under OR-conditions at levels designated for respective areas. More particularly, in FIG. 40, the area C is designated for the noise erasing of level "1" while the area D is designated for the noise erasing of level "3". In this case, the portion with oblique lines from the right to the left is processed for the noise erasing at the level "1" while the portion with the oblique lines from the left to the right is processed for the noise erasing at level "3". The overlapping area is processed for the noise erasing at levels "1" and "3".

Figure 41A:
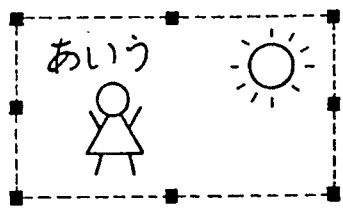
FIGS. 41A to 41D are views to explain the operation of designating noise erasing areas.
Figure 41B:
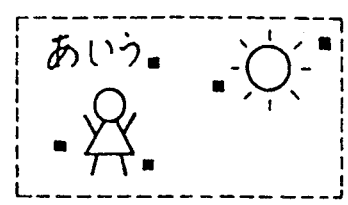
Figure 41C:
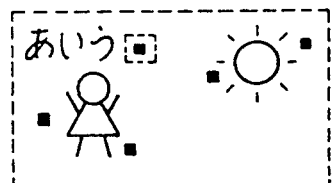
Figure 41D:
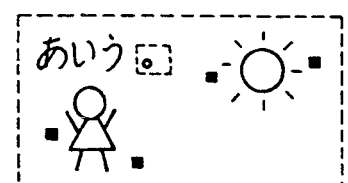

Specific sequence of the operation will now be described. First of all, an image or the objection noise erasing is arranged and the frame thereof is selected and designated as shown in FIG. 41A. When the noise mode is switched "ON", noises in the selected image are displayed in red color as shown in FIG. 41B. Noise here means what are processed as noise by the previous operations. Then, a regular rectangle command is selected to surround by designating two points -the portion where the image is deteriorated as the result of previous commands or the portion from which any noise is so far not erased. This produces a designated rectangle. When the structure display is turned "ON", the component line of a frame is displayed in a broken line as exemplified by the line L1 of FIG. 41C. The noise size of the produced frame is identical to the objective frame of the noise erasing selected as above. The noise level command is issued and the noise size of the frame is changed. Then, the portion newly judged as noise is displayed in red color as shown in FIG. 41D. In this case, as a period has been deteriorated and erased, an instruction is issued to decrease the noise level.

The instruction with the rectangle/point eraser command is used to erase all the portions where image data exist. A command by the prior art rectangle/point eraser is issued and all the black pixels inside the frame designated by the command are all erased unconditionally. The noise size cannot be changed after the formation. The target may be a mechanical sheet image or a part image; however, it is the frame which is being selected when the command to turn "ON" the noise display is issued. The operation is possible only when the noise mode is switched "ON".

Figure 42A:
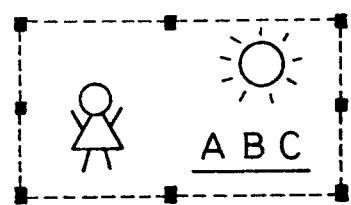
FIGS. 42A to 42D are views to explain the operation of a rectangle/point eraser.
Figure 42B:
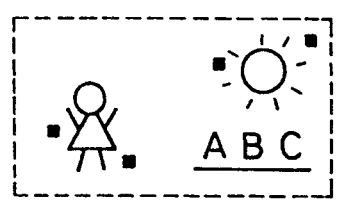
Figure 42C:
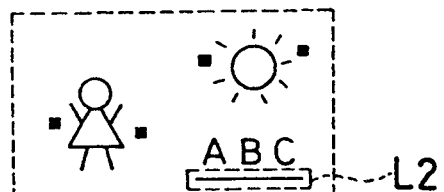
Figure 42D:
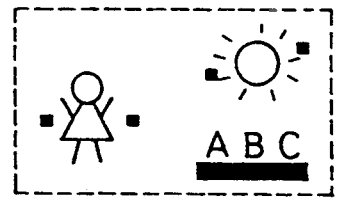

The operation is conducted in accordance with the following sequence. A frame in which exists the objective image for the noise erasing is selected and designated as shown in FIG. 42A. As the noise mode is switched "ON", noises in the selected image are displayed in red color as shown in FIG. 42B, and a rectangle/eraser command is selected. By designating two points so as to surround the area to be erased with a rectangle as shown by L2 in FIG. 42C. A rectangle as designated is formed, and the inside thereof is displayed in red color as shown in FIG. 42D. When the structure display is switched "ON", the component line of the frame is displayed with a broken line. All the black pixels inside the produced frame become subjected to erasing unconditionally. In the case of a point eraser, the same operation is executed.

The display of the noise erasing region displays the component lines when the target area for the noise erasing is to be deleted or the level of the noise erasing is to be changed. When both the noise mode and the structure display are turned "ON", the noise erasing region is displayed in a broken lines. More specifically, a frame in which am objective image for the noise erasing is arranged is selected, and the noise mode is switched "ON". Then, the structure display is turned "ON", and a noise erasing area is displayed in a broken line. If the structure display has already been turned "ON" when the noise mode is turned "ON", it is not necessary to turn "ON" the structure display. If the component line display is not needed, the structure display is turned "OFF". The rectangle/point eraser displays the component lines when a target for erasing with the eraser is to be selected. The component lines are displayed in broken lines when both the noise mode and the structure display are turned "ON". A frame in which the objective image for the noise erasing is arranged is selected, and the noise mode is switched "ON". Then, the structure display is turned "ON", and the eraser is displayed in a broken line. If the structure display has already been turned "ON" when the noise mode is switched "ON", it is not necessary to turn "ON" the structure display. When the component line display is not needed, then the structure display is turned "Off".

The setting of noise erasing level is to change the noise level designated for the frame. The level may be set in terms of noise size and a level once set may be changed later.

The sequence of operation is as follows. A frame in which are objective image for the noise erasing is selected and designated, and the noise mode is switched "ON". This makes noises in the selected image displayed in red color as shown in FIG. 43B. Then, a frame in which the noise level is to be changed is selected, and the selected frame is displayed in bold. When the noise level command is selected, a sheet as shown in FIG. 43C is displayed. Then, "YES" is selected for the noise erasing item, a desired item among noise size items is designated, and "completion" is selected. Noises erased at the designated level are displayed in red color as shown in FIG. 43D. The noise level may be set or changed by the image arrangement command instead of the noise level command.

The level setting for the noise erasing area is to set or change the level of an area. A level is set by designating an item of the noise level. Items that are once set may be subsequently changed. The operation sequence is identical to the one explained for the image frame. However, the case of noise erasing area, the level may not change by the image arrangement command.

The display of pixels for the noise erasing is to display and confirm which of the pixels have been erasing by the noise erasing command on the screen 301 of the work station 300. The result of the noise erasing is displayed in WYSIWYG (What You See Is What You Get) on the screen 301 at a display magnification arbitrarily selected. When a page switching is conducted or editing is resumed, the result of the noise erasing is also displayed. The sequence will be as follows. The commands for the noise erasing and the noise display are selected to display the message, "Noise erasing processing is in progress" and data are produced. After a while, the message, "Noise erasing processing has been completed" is displayed, and images free of noises are displayed.

The display of pixels free of noises is to confirm which of the pixels are erased with the noise erasing commands on the screen 301 of the work station 300. The pixels which have been erased by the noise erasing are displayed in red color. The display may be switched by ON/OFF switching of the noise mode. The commands which may be selected during display are drawing (pointing/point, rectangle eraser/rectangle), system (service), input/output (gallery proof, block copy output/text registration/editing completion), page (whole), layout (deletion/correction(deletion only)), noise erasing (whole) and noise display. A frame in which the objective, image is arranged is selected, and the noise mode is turned "ON". Noises within the circumscribing rectangle, of the frame are displayed in red color. The eraser and the noise erasing areas are displayed in broken lines as shown in FIG. 44. The eraser and the noise erasing areas outside the circumscribing rectangle are displayed if they correspond to particular image signals. In FIG. 44, the symbol L3 denotes the target frame of images for the noise erasing target, and L4 the noise erasing area. The symbol ER denotes an eraser.

Figure 45:
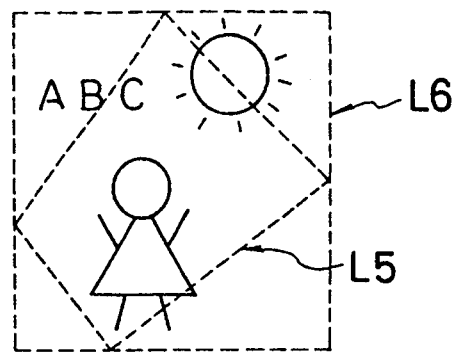
FIG. 45 is a view to explain a noise erasing area.
Figures 46A, 46B:
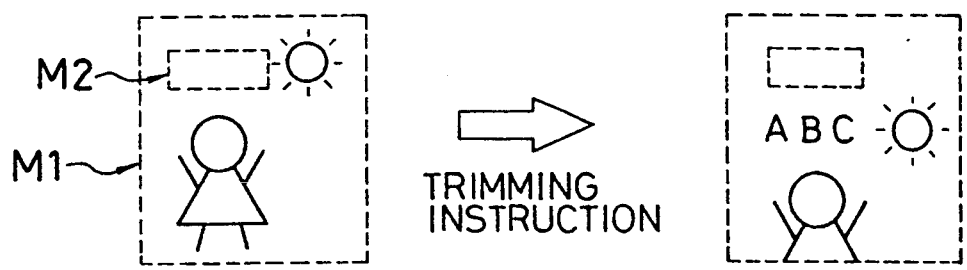
FIGS. 46A and 46B are views to explain instruction for trimming.
Figure 47:
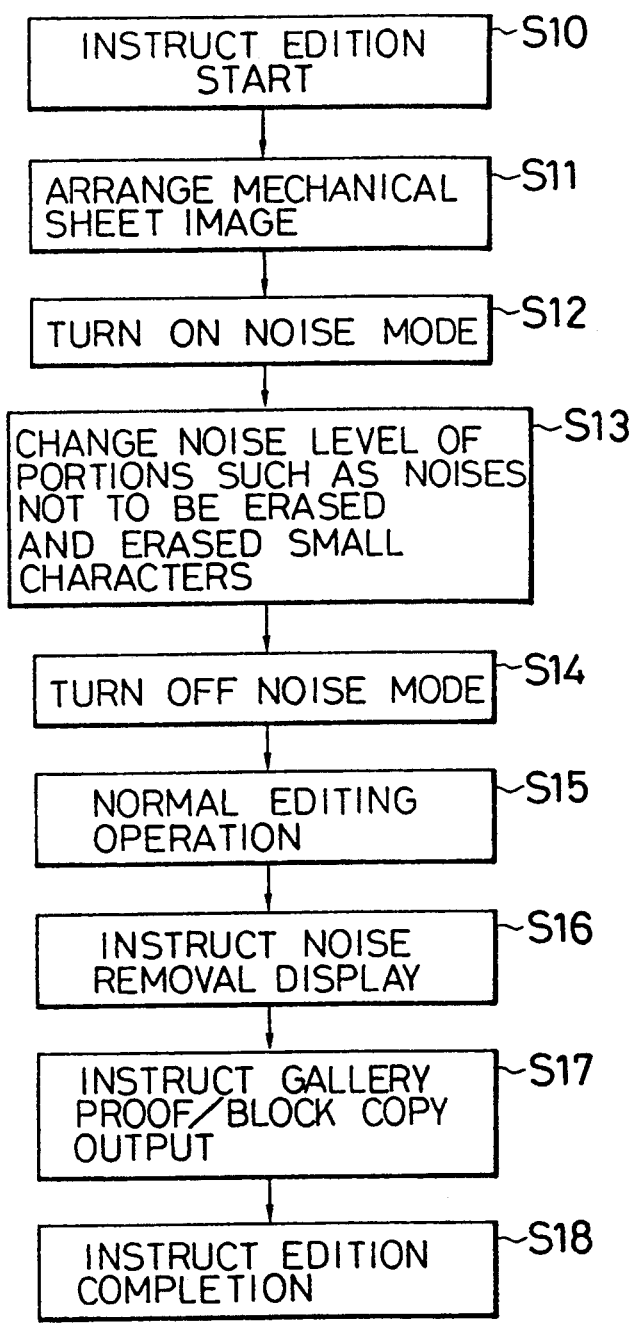
FIG. 47 is a flow chart to show the outline of operation for the noise erasing.

The noise erasing is executed on the image data. More particularly, when the noise erasing command is issued for a portion of the image data, the result is reflected on all the frames which use the particular image data. If the noise erasing command is issued for an image frame, the noise erasing is executed on the circumscribing rectangle L6 of the image frame L5 as shown in FIG. 45. Noise erasing areas and erasers are limited to regular rectangle in shape. If the position from the page origin of the objective image is changed, after the noise erasing area or an eraser is produced, relative positions of the image, the noise erasing area and the eraser are changed. The image frame may be moved, trimmed, joined, enlarged/reduced, or modified. FIGS. 46A and 46B show an example of trimming. Even if the image frame in which the noise erasing area or the eraser was produced is deleted, the noise erasing area will remain. However, if the frame in which the objective image is arranged does not exist in the page, all the noise erasing areas and erasers within the page having the target image are automatically deleted. In FIGS. 46A and 46B, the symbol M1 denotes an image frame, and M2 an eraser frame. Because of the restrictions of the system, it is impossible to store the image data for display which have been erased of noises. Therefore, image data for display are produced each time at the start of editing. For this purpose, the time allotted for the start of editing of the text for which the noise erasing is designated is relatively long. For the noise erasing of images, image arrangement sheet is roughly erasing of noises and then the level is changed for erasing noises front detailed portions by way of noise erasing area and erasers. The noise erasing processing is preferably conducted immediately after image arrangement, followed by various editing works. The flow chart in FIG. 47 shows the sequence of the noise erasing (Steps S10 to S18).

This invention system is advantageous in that it can change noise conditions locally as the system scans all the regions first to detect all the black pixel of small to large sizes, and then takes out particular groups of black pixels which meet given conditions. It is suitable for printing as it can designate not only a pixel but the size and shape thereof. Since the system forms asymptotes based on the number of pixels and the flattening, forms hyperbolas based on a specified curvature and discriminates noises by judging whether the pixels are inside or outside the hyperbolas, it can effectively erase noises of various types.

It should be understood that many modifications and adaptations of the invention will become apparent to those skilled in the art and it is intended to encompass such obvious modifications and changes in the scope of the claims appended hereto.

What is claimed is:

1. A method of noise detection and noise erasing for image data which have been read by an input means and digitized, said method comprising the steps of:
    forming a contour image of the same size as an original image,
    scanning said contour image in a predetermined sequence to identify a black pixel,
    tracing the contour of said original image having the same coordinates as said black pixel,
    storing the pixels of said contour image in a memory as contour pixels if the length of the contour is shorter than a predetermined length, wherein the predetermined length can be freely selected, and at the same time erasing said contour pixels from said contour image, listing the contour pixels stored in said memory as noise candidates, screening from said original image said noise candidates by identifying all noise candidates having a predetermined noise level within a corresponding portion of said original image, wherein said predetermined noise level is freely selectable from a plurality of noise levels, and erasing pixels corresponding to each said noise candidate determined to be noise based on said noise levels.

2. A method of noise detection and noise erasing as claimed in claim 1, wherein said noise levels are based on corresponding hyperbolas of a given curvature having the number of pixels and the flattening ratio thereof as orthogonal asymptotes.

3. A method of noise detection and noise erasing as claimed in claim 2, wherein said noise levels may be varied while said noise candidates are being displayed in colors for visual confirmation.

4. A method of noise detection and noise erasing comprising the steps of:

copying a mechanical sheet image bit map into a first portion of memory as an original region, allocating a second portion of said memory as a contour region of the same size as the original region, copying the original region into the contour region, preparing a contour bit map of the original region in the contour region, scanning all pixels of the contour bit map in the contour region from the upper-left corner to the lower-right corner, detecting black pixels defining a contour by scanning the contour region, examining a length of said contour, determining that said contour is not noise when said contour length is longer than a predetermined length, registering the contour as a noise candidate if the contour length is equal or less than the predetermined length, converting registered noise candidates into noise list files when all the scannings are completed, taking out noise data meeting at least one selected condition of noises to be erased from the noise list files, erasing said noises from the original region and forming images without noises by writing the data of the original region to a storage medium.

5. A method of noise detection and noise erasing as claimed in claim 4 further including the steps of, when the black pixel is detected in the scanning of the contour region, tracing a bit map figure from a pixel at a same position in the original region as a position of the black pixel detected in the contour region, obtaining 8-neighboring pixels in the contour region, storing traced coordinate values and the data on the 8-neighboring pixels in the memory, replacing black pixels in the obtained data on the 8-neighboring pixels with white pixels and repeating the above operations until a current position coincides with said same position.

6. A method of noise detection and noise erasing as claimed in claim 4, wherein said registering process comprises the steps of converting the stored data in the second portion of memory into coordinate data, adding the converted data to the noise list, converting coordinate axes and the data on the 8-neighboring pixels into noise block information, registering the noise block information in the noise list and again scanning the pixels from an adjacent pixel.

7. A method of noise detection and noise erasing as claimed in claim 6, wherein the noise block information comprises:

upper-left coordinates (minx, miny) and lower-right coordinates (maxx, maxy) of a rectangle surrounding a noise candidate, grand total number of the pixels in said rectangle, perimetric length of said noise candidate within said rectangle, flattening of a closed region shape, and coordinates of minx and maxx of each line within said rectangle.

* * * * *